US009590727B2

(12) United States Patent
Arimura

(10) Patent No.: US 9,590,727 B2
(45) Date of Patent: Mar. 7, 2017

(54) WIRELESS COMMUNICATION SYSTEM AND TRANSMITTER

(71) Applicant: Panasonic Intellectual Property Management Co., Ltd., Osaka (JP)

(72) Inventor: Minoru Arimura, Fukuoka (JP)

(73) Assignee: Panasonic Intellectual Property Management Co., Ltd., Osaka (JP)

( * ) Notice: Subject to any disclaimer, the term of this patent is extended or adjusted under 35 U.S.C. 154(b) by 0 days.

(21) Appl. No.: 14/731,100

(22) Filed: Jun. 4, 2015

(65) Prior Publication Data

US 2015/0365168 A1 Dec. 17, 2015

(30) Foreign Application Priority Data

Jun. 16, 2014 (JP) ................................ 2014-123558

(51) Int. Cl.

| | |
|---|---|
| ***H04H 40/00*** | (2009.01) |
| ***H04B 10/112*** | (2013.01) |
| ***H04W 56/00*** | (2009.01) |
| *H04R 27/00* | (2006.01) |

(52) U.S. Cl.

CPC .... *H04B 10/1121* (2013.01); *H04W 56/0015* (2013.01); *H04R 27/00* (2013.01); *H04R 2410/00* (2013.01); *H04R 2420/07* (2013.01)

(58) Field of Classification Search

CPC ..... H04W 4/003; H04W 84/20; H04W 12/06; H04W 76/023; H04W 4/008; H04W 84/18; H04W 12/02; H04W 40/24; H04W 40/246; H04W 48/16; H04W 60/04; H04W 76/02; H04W 88/04; H04W 12/04; H04W 16/14

USPC ................................................ 455/3.06, 415

See application file for complete search history.

(56) References Cited

U.S. PATENT DOCUMENTS

| | | | | |
|---|---|---|---|---|
| 5,495,520 A * | 2/1996 | Kojima ................ | H04M 1/727 455/411 | |
| 2015/0341973 A1* | 11/2015 | El-Hoiydi ............ | H04W 4/206 455/3.06 | |

FOREIGN PATENT DOCUMENTS

| | | |
|---|---|---|
| JP | 05-327623 A | 12/1993 |

* cited by examiner

*Primary Examiner* — Tu X Nguyen

(74) *Attorney, Agent, or Firm* — Seed IP Law Group LLP

(57) ABSTRACT

In a wireless communication system, a transmitter that transmits data and a plurality of receivers wirelessly communicate with each other. The transmitter includes a first storage unit that stores first identification information of one of the receivers; a first communication unit that transmits the data; and a switching unit that switches a transmission destination of the data to another receiver having the first identification information stored in the first storage unit. The receiver includes a second storage unit that stores second identification information of a plurality of the transmitters; and a second communication unit that receives the data from the transmitter having the second identification information. Both the transmitter and the receiver store the first identification information and the second identification information to each other.

12 Claims, 17 Drawing Sheets

WIRELESS COMMUNICATION SYSTEM AND TRANSMITTER

BACKGROUND OF THE INVENTION

1. Field of the Invention

The present invention relates to a wireless communication system and a transmitter.

2. Description of the Related Art

For example, Japanese Patent Unexamined Publication No. 5-327623 discloses an infrared transceiver system using infrared light. In the infrared transceiver system, a plurality of infrared receivers is installed in a room, and the infrared receiver and one of a plurality of microphones communicate with each other by using infrared light. For example, when the infrared transceiver system is used in a plurality of adjacent rooms, it can be used without being concerned about the adjacent rooms, and is very convenient.

The convenience of the above infrared transceiver system is excellent as described above, but due to the properties of infrared light, the communication quality is sometimes degraded by being affected by an obstacle and external light.

SUMMARY OF THE INVENTION

The present invention has been made in view of the above situation, and provides a wireless communication system and a transmitter that are capable of suppressing the degradation of communication quality, while being convenient.

A wireless communication system in which a transmitter that transmits data and a plurality of receivers wirelessly communicate with each other, in which the transmitter includes a first storage unit that stores first identification information of one of the receivers; a first communication unit that transmits the data; and a switching unit that switches a transmission destination of the data to another receiver having the first identification information stored in the first storage unit, the receiver includes a second storage unit that stores second identification information of a plurality of the transmitters; and a second communication unit that receives the data from the transmitter having the second identification information, and both the transmitter and the receiver store the first identification information and the second identification information to each other. According to the present invention, it is possible to suppress the degradation of communication quality, while providing convenient.

DETAILED DESCRIPTION OF THE PREFERRED EMBODIMENTS

Hereinafter, embodiments of the present invention will be described with reference to the drawings.

Wireless communication systems in the following embodiments are applied to, for example, a microphone system (sound pickup system) which is provided over a plurality of rooms.

Figure 1:
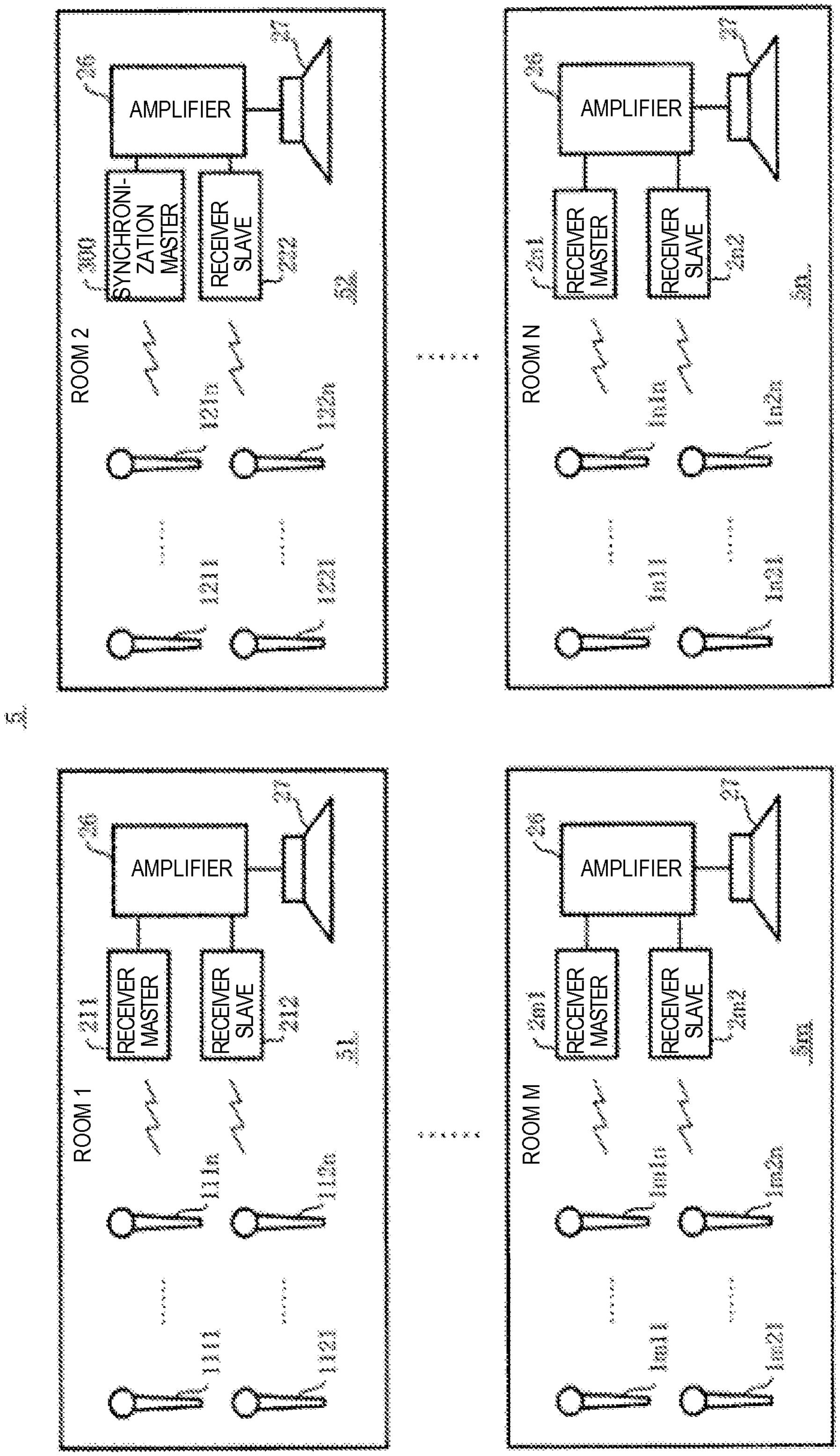
FIG. 1 is a schematic diagram illustrating an entire configuration example of a microphone system in an embodiment.

FIG. 1 is a schematic diagram illustrating an entire configuration example of microphone system 5 in a first embodiment. Microphone system 5 includes, for example, one or more groups each of which is formed in each room.

For example, FIG. 1 illustrates an example of one floor, in which room 1 to room m and room 2 to room n, separated by walls or passages, are provided in two rows in a vertical direction. Here, m and n are respectively positive integers. Without being limited to the configuration of FIG. 1, for example, rooms may be present in a single row in a predetermined direction or in three or more rows, or may be arranged like other shapes. As an example of FIG. 1, a classroom in a school is considered.

In FIG. 1, for example, one group is formed in one room. The group formed in each room includes, for example, a plurality of microphones, a receiver master, a receiver slave, an amplifier, and a speaker. A determination as to whether or not devices belong to the same group depends on, for example, whether or not examples of identification information (IDs) of devices are registered to each other.

For example, group 51 including microphones 1111 to 111*n*, and 1121 to 112*n*, receiver master 211, receiver slave 212, amplifier 26, and speaker 27 is formed in room 1.

Microphones 1111 to 111*n* are wirelessly connected to, for example, receiver master 211. Microphones 1121 to 112*n* are wirelessly connected to, for example, receiver slave 212. The value "n" used for microphones 111*n* and 112*n* and room n may be the same or may be different.

Similarly, group 5*m* including microphones 1*m*11 to 1*m*1*n* and 1*m*21 to 1*m*2*n*, receiver master 2*m*1, receiver slave 2*m*2, amplifier 26, and speaker 27 is formed in room m.

Similarly, group 5*n* including microphones 1*n*11 to 1*n*1*n* and 1*n*21 to 1*n*2*n*, receiver master 2*n*1, receiver slave 2*n*2, amplifier 26, and speaker 27 is formed in room n.

Group 52 including microphones 1211 to 121*n* and 1221 to 122*n*, synchronization master 300, receiver slave 222, amplifier 26, and speaker 27 is formed in room 2. Synchronization master 300 also has a function of a receiver master, and controls a synchronization timing of each receiver master. Synchronization master 300 may be disposed in any room, but is preferably disposed in a center room (a room having receiver master 211 provided therein) in a floor in terms of a communication range.

Since respective microphones (an example of a sound pickup device or a transmitter) have the same specification, if there is no particular need to distinguish the microphones, a description will be made with microphone 1111 as a representative. Similarly, since respective receiver masters and respective receiver slaves have the same specifications, if there is no particular need to distinguish the receiver masters and the receiver slaves, a description will be made with receiver master 211 and receiver slave 212 as representatives. When there is no need to distinguish a receiver master and a receiver slave, they are simply referred to as a receiver.

Microphone 1111, receiver master 211, and receiver slave 212 are connected with each other through a communication network in the same group. A time division multiplexing scheme is used as a communication scheme through the communication network. The time division multiplexing scheme includes, for example, time division multiple access (TDMA). For example, digital enhanced cordless telecommunications (DECT) standard is used for communication using the time division multiplexing scheme.

The communication scheme is not limited to DECT, other communication schemes (for example, 2.4 GHz band digital cordless, or a personal handy-phone system (PHS)) using the time division multiplexing scheme may be used, and a frequency division multiplexing scheme (for example, wireless local area network (LAN)) other than the time division multiplexing scheme may be used.

In microphone system 5, one synchronization master 300 is present in all of the groups, and one receiver master is present in each group. The receivers in the same group are synchronized with each other (for example, frame synchronization). In the frame synchronization, the timings of transmission and reception of respective devices (for example, each microphone and each receiver) substantially match.

The radio wave intensity of the receiver master is set in such a manner that radio waves reach a group to which the receiver master belongs. The radio wave intensity of the synchronization master is set in such a manner that radio waves reach all of the groups in microphone system 5. Therefore, the radio wave intensity of the synchronization master is greater than the radio wave intensity of the receiver master which does not serve as the synchronization master.

A predetermined number of (for example, two) microphones can be wirelessly and simultaneously connected to one receiver. The number of simultaneous connection possible microphones depends on, for example, the processing performance of the microphone.

When the maximum allowable number (for example, two) of microphones are being used (in wireless connection) (also referred to as "Busy") for one receiver, if third microphone makes a request for communication, for example, the third microphone is connected to a different receiver in the same group through switching. In other words, the third microphone performs the switching (handover) of the receiver.

Even if the number of microphones is not the maximum allowable number, when the processing load of another receiver is low, the handover may be performed.

Figure 2:
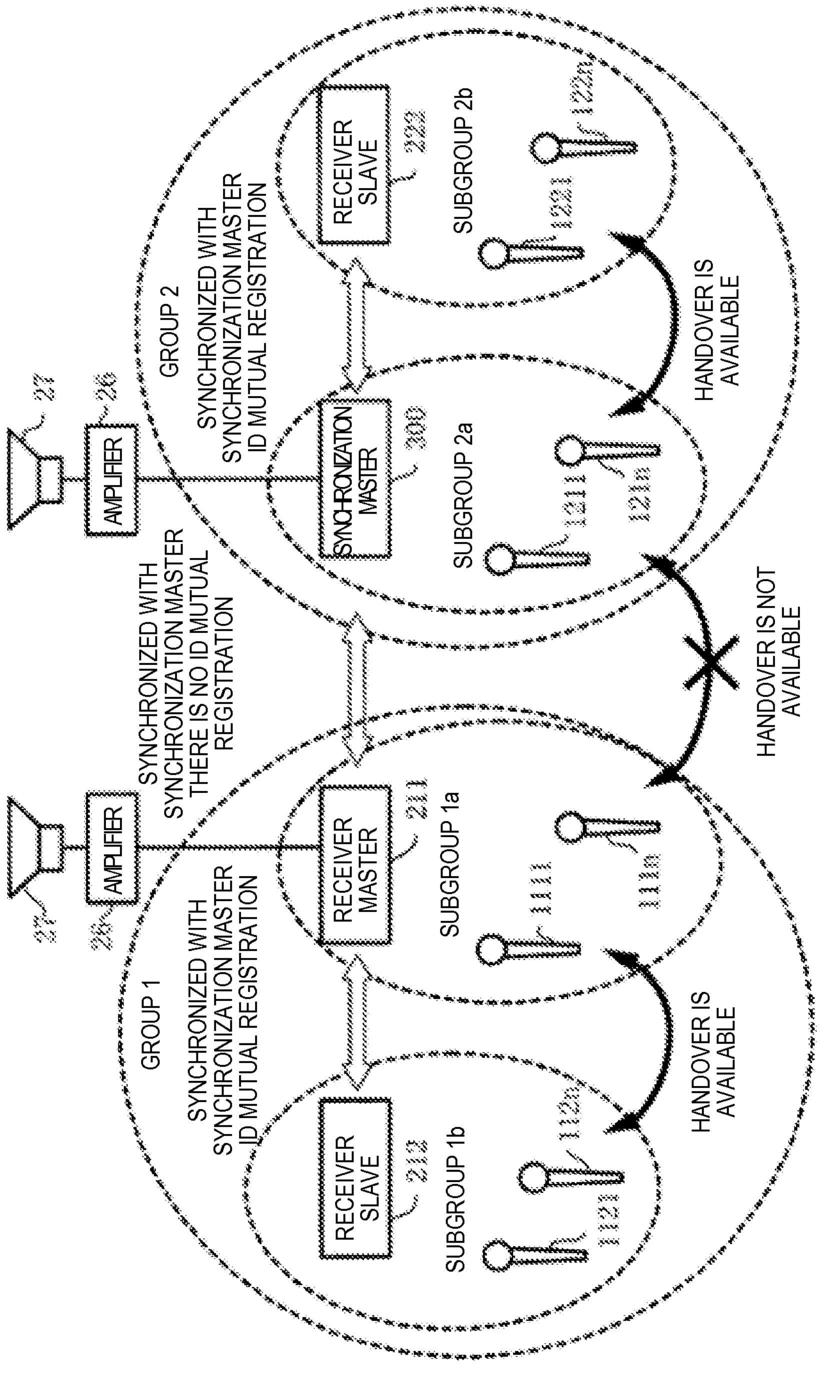
FIG. 2 is a schematic diagram explaining a handover in the microphone system in the embodiment.

FIG. 2 is a schematic diagram explaining the handover by the microphone. The handover is performed between the receivers in the same group, and is not performed across groups. In FIG. 2, for example, group 51 formed in room 1 corresponds to group 1. For example, group 52 formed in room 2 corresponds to group 2.

In FIG. 2, each group includes one or more subgroups. The subgroup is configured to include, for example, one or more microphones having the IDs of the other microphones registered to each other and one receiver (a receiver master or a receiver slave). A group includes, for example, a plurality of receivers having the IDs of the other receivers registered to each other, and one or more microphones which are registered to one of the plurality of receivers.

Microphones 1111 to 111*n* in subgroup 1*a* connected to receiver master 211 in group 1 are able to belong to subgroup 1*b* by switching the destination to be connected, to receiver slave 212 in same group 1. Meanwhile, microphones 1111 to 111*n* do not switch the destination to be connected, to receivers (for example, synchronization master 300 and receiver slave 222) in group 2 that is different from group 1.

As will be described later, a group is configured by registering the identifier (ID) (an example of an identification code) of a microphone to any one receiver in a group. Thus, even if respective microphones are not subjected to a registration process to all receivers in the same group, IDs can be held to each other between all receivers and each microphone, and thus it is possible to reduce the complexity of registration.

Next, the configuration example of microphone system 5 will be described.

Figure 3:
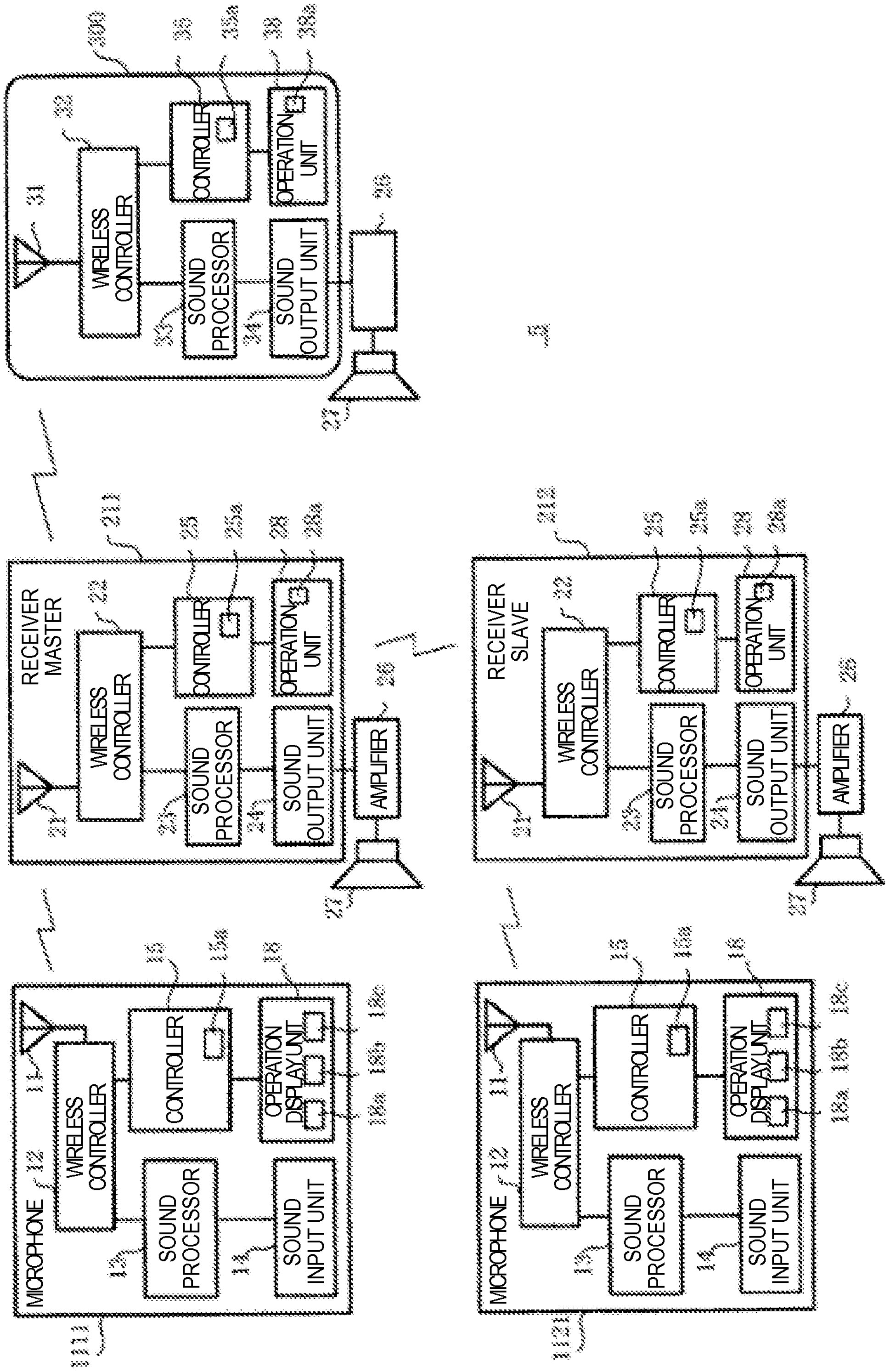
FIG. 3 is a block diagram illustrating a configuration example of the microphone system in the embodiment.

FIG. 3 is a block diagram illustrating a configuration example of microphone system 5.

Microphone system 5 includes, as described above, a plurality of groups. Microphone system 5 includes for each group, for example, microphones, a receiver master, a receiver slave, amplifiers, and speakers. The microphones, the receiver master, the receiver slave, the amplifiers, and the speakers are connected to each other through, for example, a communication network. At least one of the amplifiers and the speakers may be included, for example, in a receiver master or a receiver slave.

In FIG. 3, a synchronization master having a function of a receiver master is installed in room 2, instead of the receiver master.

As described above, the microphones, the receiver master, the receiver slave, the amplifiers, and the speakers, which are included in each group, have the same specification. Here, as an example, a description will be made using microphones 1111 to 111*n*, receiver master 211, receiver slave 212, amplifiers 26, and speakers 27 installed in room 1 (group 1, 51).

Microphone 1111 includes antenna 11, wireless controller 12, sound processor 13, sound input unit 14 (an example of a sound pickup unit), controller 15, and operation display unit 18. Since microphone 1121 has the same components as in microphone 1111, the components are denoted by the same reference numerals, and a description thereof will be omitted.

Wireless controller 12 (an example of a first communication unit, or a communication controller) is wirelessly connected to a receiver through, for example, antenna 11, and performs wireless communication therewith. Wireless controller 12 performs, for example, a reverse operation of a communication slot (simply referred to as a slot or a time slot). The reverse operation is an operation to reverse a predetermined slot, in one frame that is configured with a transmission frame and a reception frame, from a transmission slot to a reception slot, or from a reception slot to a transmission slot. For example, a slot in the transmission frame is usually used for transmission, but the reverse operation allows the slot in the transmission frame to be used as a reception slot for reception. Further, wireless controller 12 searches for, for example, a receiver.

Sound processor 13 processes audio (a sound signal) input from sound input unit 14. In the present embodiment, "audio" is not limited to a sound that human makes, but includes various types of sounds such as an instrument sound and a buzzer sound.

Controller 15 controls entire microphone 1111. Controller 15 includes, for example, a central processing unit (CPU), a read only memory (ROM), and a random access memory (RAM). For example, the CPU executes the program stored in the ROM so as to implement each function of controller 15.

Controller 15 includes storage unit 15*a* that stores IDs of a plurality of receivers (for example, receiver master 211 and receiver slave 212). The IDs of the plurality of receivers may be registered in advance, or may be registered at any timing through a registration process. Microphone 1111 may not store the IDs of other microphones. Storage unit 15*a* is an example of a first storage unit. The ID of a receiver is an example of first identification information. The ID of a microphone is an example of second identification information.

Controller 15 switches (hands over), for example, a receiver destined to be connected, to a receiver in the same group. For example, when wireless connection to the receiver destined to be connected is not possible, controller 15 refers to the ID of the receiver stored in storage unit 15*a*, and determines a receiver to be switched. Controller 15 instructs wireless controller 12 to switch the destination to be connected, to the determined receiver. Therefore, controller 15 is an example of a switching unit.

Operation display unit 18 receives various operations, and performs various displays. Operation display unit 18 includes, for example, registration button 18*a* operated by the operator of microphone 1111, call button 18*b* used for a call start operation, LED 18*c* for error notification, and the like. Registration button 18*a* and call button 18*b* are examples of the operation unit. The LED is an example of the display unit.

Receiver master 211 includes antenna 21, wireless controller 22, sound processor 23, sound output unit 24, controller 25, and operation unit 28. Since receiver slave 212 has the same components, the components are denoted by the same reference numerals, and a description thereof will be omitted.

Wireless controller 22 (an example of a second communication unit) is wirelessly connected to receiver slave 212, synchronization master 300, and microphone 1111, through for example, antenna 21, and performs wireless communication therewith. Wireless controller 22 performs, for example, a slot reverse operation.

Sound processor 23 processes a sound signal that is acquired from wireless controller 22, and outputs the processed signal to sound output unit 24.

Sound output unit 24 outputs the sound signal from sound processor 23 to amplifier 26.

Amplifier 26 amplifies the sound signal from sound output unit 24. Speaker 27 makes a sound of the sound signal (audio output).

Operation unit 28 receives various operations. Operation unit 28 includes, for example, registration button 28*a*, and receives the registration operation and the like by the operator of receiver master 211.

Controller 25 controls entire receiver master 211. Controller 25 includes, for example, a CPU, a ROM, and a RAM. For example, the CPU executes the program stored in the ROM so as to implement each function of controller 25.

Controller 25 includes storage unit 25*a* that stores for example, the IDs of the registered microphones (for example, 1111 to 111*n*) in the group, and the ID of another receiver (for example, receiver slave 212) in the group. Controller 25 refers to, for example, the IDs stored in storage unit 25*a*, and supports the handover by microphones 1111, 1121 in cooperation with another receiver. Controller 25 stores all IDs of other devices (for example, another receiver and microphones) in the same group (for example, room 1), in storage unit 25*a*. Storage unit 25*a* is an example of the second storage unit.

Synchronization master 300 is provided, for example, in room 2 (group 2, 52). Synchronization master 300 transmits a control channel (CCH) signal using a predetermined slot (for example, a first slot), in order to synchronize all receiver masters. Each receiver master is synchronized with each receiver slave and microphones in a group to which the receiver master belongs. Therefore, entire microphone system 5 is synchronized.

Synchronization master 300 has a function of the receiver master, and has the same components as in the receiver master. In other words, synchronization master 300 includes antenna 31, wireless controller 32, sound processor 33, sound output unit 34, controller 35, and operation unit 38.

Wireless controller 32 is wirelessly connected to receiver master 211 through, for example, antenna 31, and performs wireless communication therewith.

Sound processor 33 processes a sound signal input from wireless controller 32, and outputs the processed signal to sound output unit 34.

Sound output unit 34 outputs a sound signal from sound output unit 34 to amplifier 26.

Amplifier 26 amplifies the sound signal from sound output unit 34. Speaker 27 makes a sound of the sound signal (audio output).

Operation unit 38 receives various operations. Operation unit 38 includes, for example, registration button 38*a*, and receives the registration operation and the like by the operator of synchronization master 300.

Controller 35 controls entire synchronization master 300. Controller 35 includes, for example, a CPU, a ROM, and a RAM. For example, the CPU executes the program stored in the ROM so as to implement each function of controller 35.

Controller 35 includes storage unit 35*a* that stores, for example, the IDs of the registered microphones in a group, and the ID of another receiver in the group. Controller 35 refers to, for example, the IDs stored in storage unit 35*a*, and supports the handover by the microphones in cooperation with another receiver. Controller 35 stores all IDs of other devices in the same group, in storage unit 35*a*. Controller 35 is synchronized with at least one receiver master. In other words, controller 35 is an example of a synchronization unit.

Next, the configuration example of ID used by each device will be described.

The ID of synchronization master 300 includes, for example, an identification ID specific to synchronization master 300. The ID of receiver master 211 includes, for example, an identification ID specific to receiver master 211. The ID of microphone 1111 includes, for example, an identification ID specific to microphone 1111. The ID of each device is, for example, DECT_ID.

Next, the operation example of microphone system 5 will be described.

First, the slot configuration in the communication performed between synchronization master 300, receiver master 211, receiver slave 212, and microphones 1111, 1112, and 1121 will be described.

(During Standby)

Figure 4:
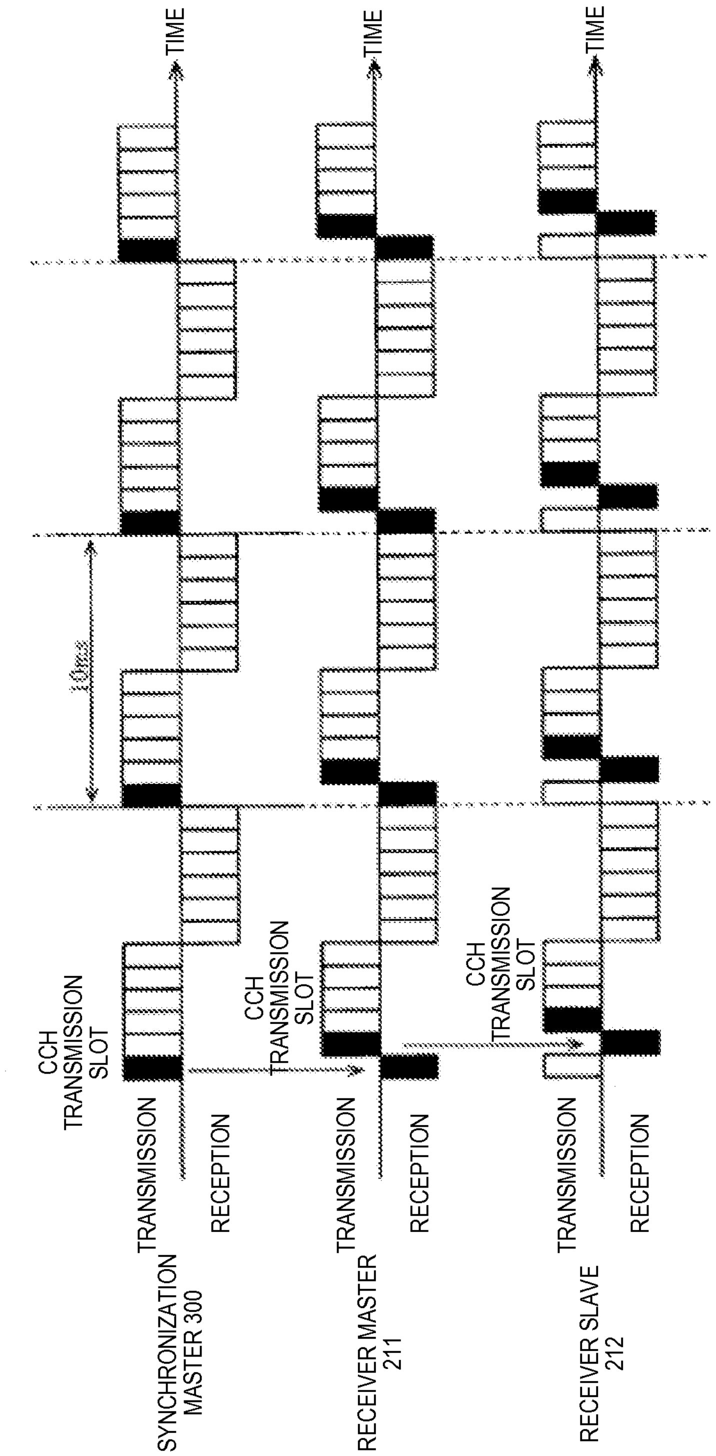
FIG. 4 is a timing chart illustrating a configuration example of a slot during standby in the embodiment.

FIG. 4 is a timing chart illustrating an example of a configuration of a slot during standby. “During standby” is a period in which, for example, actual data (for example, audio data, image data, and video data) is not communicated and control data (for example, a CCH signal) is communicated.

In FIG. 4, one frame (1 cycle, for example, 10 msec) is configured to include 12 slots. With respect to slots of one frame, transmission slots and reception slots are periodically repeated, and each appears continuously in groups of six slots. For example, in one frame, six slots in the first half correspond to a transmission slot period (a transmission frame), and six slots in the second half correspond to a reception slot period (a reception frame). The first half may be the reception slot period, and the second half may be the transmission slot period. Synchronization master 300, receiver master 211, and receiver slave 212 transmit a CCH signal by using a predetermined slot in each frame.

In synchronization master 300, wireless controller 32 transmits the CCH signal to receiver master 211 in a predetermined slot (for example, a first slot) in each cycle. The header of the CCH signal from synchronization master 300 includes, for example, the ID of the synchronization master and information about the slot number in which the CCH signal is communicated. The CCH signal transmitted from synchronization master 300 is received by respective receiver masters 211, 2*m*1, and 2*n*1 other than the synchronization master. Therefore, in each of receiver masters 211, 2*m*1, and 2*n*1, wireless controller 22 can recognize that the CCH signal is transmitted from synchronization master 300, by referring to the header of the CCH signal.

In receiver master 211, wireless controller 22 uses all slots in a frame as reception slots until reception, in order to receive the CCH signal from synchronization master 300. For example, when power is turned on, wireless controller 22 checks data (including the CCH signal) from synchronization master 300, by using all slots as reception slots. Wireless controller 22 is synchronized with radio waves from a device with an unregistered ID (radio waves estimated as being transmitted from synchronization master 300), by referring to, for example, the IDs stored in storage unit 25*a* of controller 25. In other words, frames (a transmission frame and a reception frame) are synchronized between wireless controller 22 and synchronization master 300. Wireless controller 22 uses a slot in which synchronization master 300 has transmitted the CCH signal, as the reception slot. For example, when the CCH signal is transmitted in the first slot in each frame, wireless controller 22 reverses the first slot in each one frame, which has originally been the transmission slot, into the reception slot. Thus, the CCH signal from synchronization master 300 can be periodically received.

In receiver slave 212, since wireless controller 22 does not receive the CCH signal from synchronization master 300, even if the power is turned on, the first slot is not reversed. Therefore, the first slot is still the transmission slot. This is because receiver slave 212 may recognize the transmission timing of the CCH signal from receiver master 211 so as to receive the CCH signal from receiver master 211.

In other words, receiver master 211 is synchronized with a device with an ID that is not stored in storage unit 25*a*. Meanwhile, receiver slave 212 is synchronized with a device with an ID that is stored in storage unit 25*a*, and does not consider the device with the ID that is not stored.

In receiver master 211, if the CCH signal is received in the first slot of each cycle, wireless controller 22 transmits the CCH signal in a predetermined slot (for example, a second slot) of each cycle. In receiver master 211, wireless controller 22 may check, for example, data in all slots for one cycle after receiver master 211 is powered on, and select a predetermined slot from slots which are not used. Alternatively, a predetermined slot may be determined in advance.

The CCH signal from receiver master 211 is received by, for example, receiver slave 212 and microphones 1111 and 1112 under the control of receiver master 211. The header of the CCH signal from receiver master 211 includes, for example, the ID of receiver master 211, and information about the slot number in which the CCH signal is communicated.

In receiver master 211, controller 15 may make the operation be in a stopped state (No Active), in the slot which is not used for transmission, for example, after one cycle has elapsed since power is turned on.

In receiver slave 212, if the CCH signal is received from receiver master 211 in a second slot in each cycle, wireless controller 22 transmits the CCH signal in a predetermined slot (for example, a third slot) in each cycle. In receiver slave 212, wireless controller 22 may check, for example, data in all slots for one cycle after receiver slave 212 is powered on, and select a predetermined slot from slots which are not used. Alternatively, a predetermined slot may be determined in advance.

The CCH signal from receiver slave 212 is received by, for example, microphones 1121 under the control of receiver slave 212. The header of the CCH signal from receiver slave 212 includes, for example, the ID of receiver slave 212, and information about the slot number in which the CCH signal is communicated.

In receiver slave 212, controller 15 may make the operation be in a stopped state (No Active), in the slot which is not used for transmission, for example, after one cycle has elapsed since power is turned on.

(Usage of Two Slots in One-Way Communication at a Call Start Time)

Figure 5:
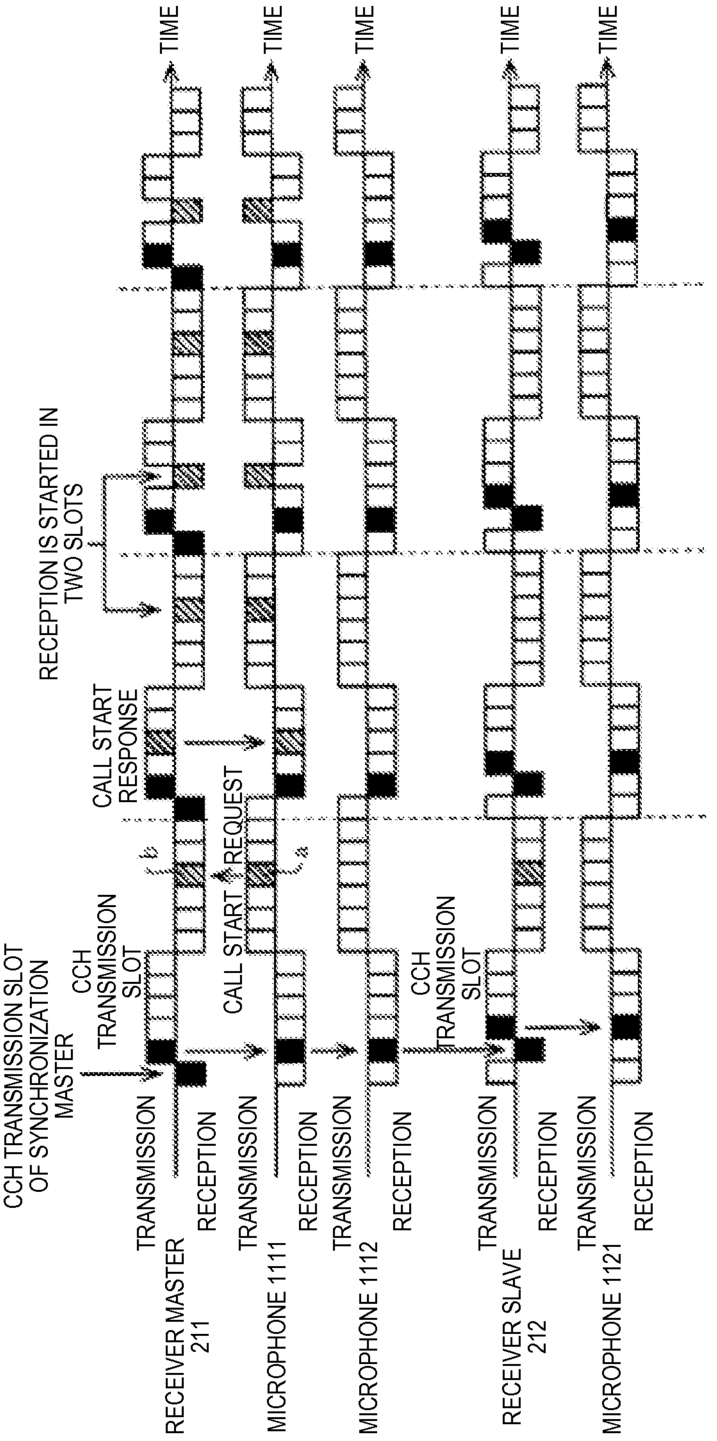
FIG. 5 is a timing chart illustrating a configuration example of a slot at a call start time in the case where audio data is communicated using two slots by one-way communication (Simplex) in the embodiment.

FIG. 5 is a timing chart illustrating a configuration example of a slot at a call start time in the case where audio data is communicated using two slots in one-way communication (Simplex). A later description regarding the timing chart will be made assuming there is one communication channel, and the same will be applied to the case of having a plurality of channels (frequency bandwidths).

One-way communication indicates communication in which transmission slots are secured in one of two parties that communicate with each other and transmission slots are not secured in the other of the two parties that communicate with each other. Communication start time is, for example, a period including a call start request by one of the microphones.

Each microphone stores the receiver destined to be connected as default (initial configuration), for example, in storage unit 15*a*. Microphones 1111 and 1112 are connected to, for example, receiver master 211 as a default. Microphone 1121 is connected to, for example, receiver slave 212 as a default.

In each microphone, wireless controller 12 checks data in all slots for one cycle after each microphone is powered on, and communicates data (for example, audio data and control data) using slots which are not used. Alternatively, the slots used by each microphone may be determined in advance. Wireless controller 12 transmits information about the slot (for example, a slot number) is used for communication, to a predetermined receiver (for example, a default receiver).

In this case, wireless controller 12 may determine a slot to be used for communication, by referring to the CCH signal from the receiver (the receiver master or the receiver slave). For example, the CCH signal includes information about the use state of the slot that is checked by the receiver, wireless controller 12 may determine a free slot as a slot to be used for communication, depending on the CCH signal. Therefore, the CCH signal is an example of the second control data, and wireless controller 12 is an example of the communication controller.

In each receiver, for example, when power is turned on, wireless controller 22 receives information including which slot is used for communication, from each microphone, and recognizes the slot as a slot used for communication with a microphone.

In FIG. 5, microphone 1111 receives the CCH signal from receiver master 211 in the second slot (in FIG. 5, a black slot) before a call starts, and does not perform communication in other slots (in FIG. 5, white slots). Microphone 1121 receives the CCH signal from receiver slave 212 in the third slot before a call starts, and does not perform communication in other slots.

When microphone 1111 determines, for example, a slot number used for communication, it checks and determines which slot does not have interference. In this case, microphone 1111 enables, for example, all slots for one cycle, and checks which slot is not used in microphone system 5.

In FIG. 5, in microphone 1111, wireless controller 12 transmits a call start request to receiver master 211, in a tenth slot (in a fourth slot in a transmission slot period) (in FIG. 5, a hatched slot a). The header of the call start request includes, for example, the ID of microphone 1111, and the slot number in which the call start request is transmitted, and the ID (default) of the destination receiver. Here, the ID of the destination receiver is, for example, receiver master 211.

In FIG. 5, in receiver master 211, wireless controller 22 receives the call start request from microphone 1111 in the tenth slot (the fourth slot in the reception slot period) (In FIG. 5, a hatched slot b). Although receiver slave 212 also receives the call start request in the tenth slot (the fourth slot in the reception slot period), the call start request is not destined for receiver slave 212, and receiver slave 212 does not respond to the call start request.

In receiver master 211, wireless controller 22 checks the default value of ID of a destination receiver, and transmits a call start response to microphone 1111, for example, in the same slot (fourth slot) of the second cycle. In microphone 1111, wireless controller 12 receives the call start response from receiver master 211, for example, in the fourth slot of the second cycle.

If the call is started between receiver master 211 and microphone 1111, in microphone 1111, wireless controller 12 transmits audio data, for example, in the tenth slot for the second cycle (the fourth slot in the transmission slot period). In microphone 1111, wireless controller 12 reverses the fourth slot of the third cycle to the transmission slot, and transmits the audio data.

Meanwhile, in receiver master 211, wireless controller 22 receives the audio data, for example, in the tenth slot for the second cycle (the fourth slot in the reception slot period). In receiver master 211, wireless controller 22 reverses the fourth slot of the third cycle to the reception slot, and receives the audio data. In this manner, a call is performed using two slots in one frame.

In this manner, microphone 1111 can transmit audio data twice in a predetermined slot (for example, the fourth slot) in the transmission slot period and the reception slot period of each cycle. Receiver master 211 can receive the audio data twice in a predetermined slot (for example, the fourth slot) in the transmission slot period and the reception slot period of each cycle.

Therefore, wireless controller 22 reverses the transmission slot of receiver master 211 in which reception is frequently performed, to the reception slot, and wireless controller 12 reverses the reception slot of microphone 1111 in which transmission is frequently performed, to the transmission slot. Thus, it is possible to use double slots for transmission of microphone 1111 by reversing a slot having a low frequency of use in one frame and to improve the quality of audio data while improving the utilization efficiency of radio resources.

For example, in the case of communicating different audio data pieces in two instances of communication in one frame, the communication data amount is doubled, and the sound quality of the audio data can be improved. In the case of communicating the same audio data in two instances of communication in one frame, error tolerance can be improved. In two instances of communication in one frame, a part of the data can be overlapped, and the sound and the error tolerance can be improved.

In this manner, in the communication using two slots in one-way communication, the amount of transmission data increases, such that it is possible to transmit clear audio data. Due to a slot diversity effect, the error tolerance can be improved.

Since each microphone determines the position of the slot for transmitting audio data according to for example, the CCH signal, it is possible to suppress the communication using the same slot as in other devices (for example, a receiver, and another microphone), and suppress communication interference.

(Usage of Two Slots in One-Way Communication During a Call)

Figure 6:
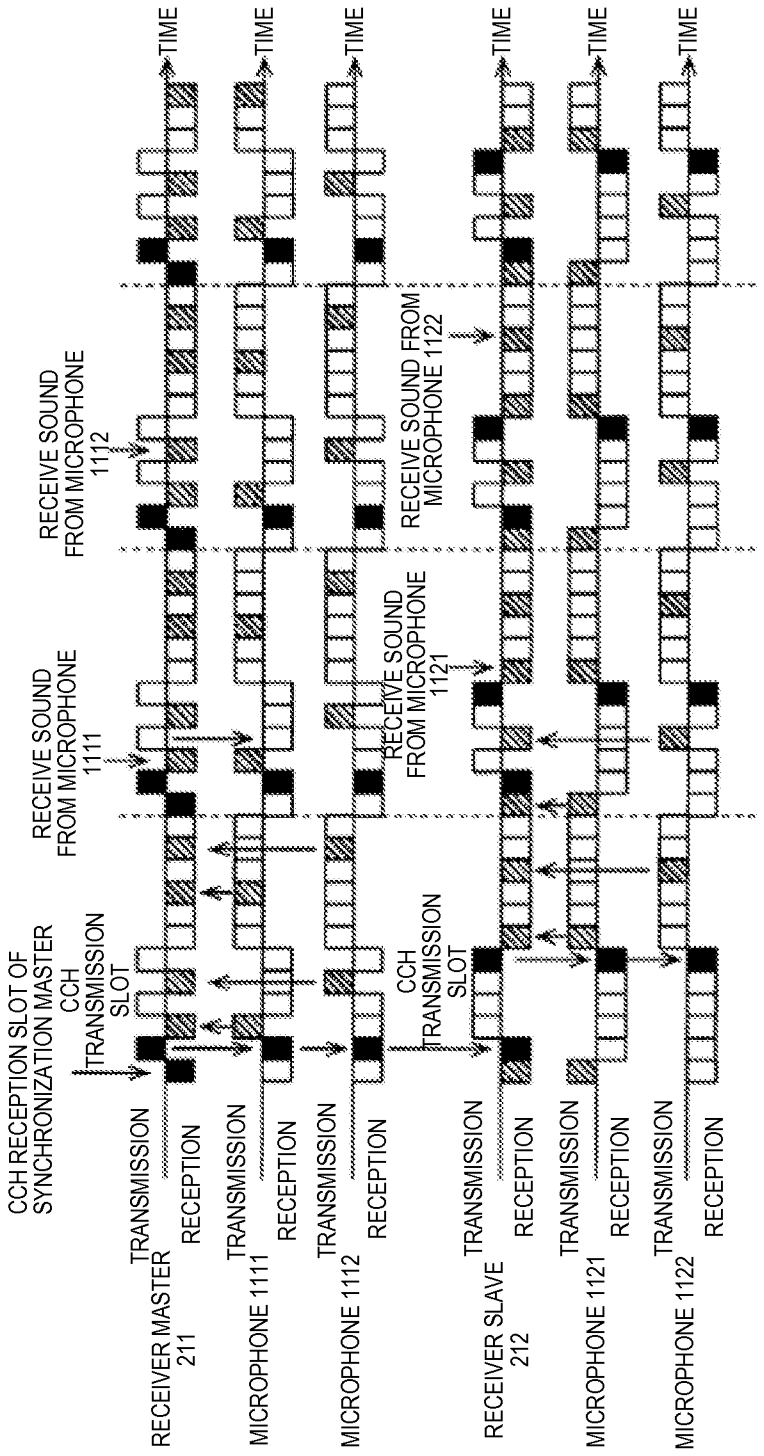
FIG. 6 is a timing chart illustrating a configuration example of a slot during a call in the case where audio data is communicated using two slots by one-way communication (Simplex) in the embodiment.

FIG. 6 is a timing chart illustrating a configuration example of a slot during a call, in the case where audio data is communicated using two slots in one-way communication (Simplex). "During a call" is, for example, a period in which a call continues after the call is started.

FIG. 6 illustrates that respective microphones 1111, 1112, 1121, and 1122 are simultaneously connected to respective receivers using separate slots.

In microphone 1111, wireless controller 12 transmits audio data, for example, in the third slot of the transmission slot period and the reversed third slot in the reception slot period, to receiver master 211 (in FIG. 6, a hatched slot).

In microphone 1112, wireless controller 12 transmits audio data, for example, in the fifth slot of the transmission slot period and the reversed fifth slot in the reception slot period, to receiver master 211 (in FIG. 6, a hatched slot).

In microphone 1121, wireless controller 12 transmits audio data, for example, in the first slot of the transmission slot period and the reversed first slot in the reception slot period, to receiver slave 212 (in FIG. 6, a hatched slot).

In microphone 1122, wireless controller 12 transmits audio data, for example, in the fourth slot of the transmission slot period and the reversed fourth slot in the reception slot period, to receiver slave 212 (in FIG. 6, a hatched slot).

In this manner, in the case of performing one-way communication using two slots, the amount of transmission data increases, such that it is possible to transmit clear audio data. Due to slot diversity effect, the error tolerance can be improved.

Since each microphone determines the position of the slot for transmitting audio data according to for example, the CCH signal, it is possible to suppress the communication using the same slot as in other devices (for example, another microphone), and suppress communication interference.

Here, the case of using a single channel is shown, but communication may be performed using a plurality of channels.

(Usage of a Single Slot at a Call Start Time in Two-Way Communication)

Figure 7:
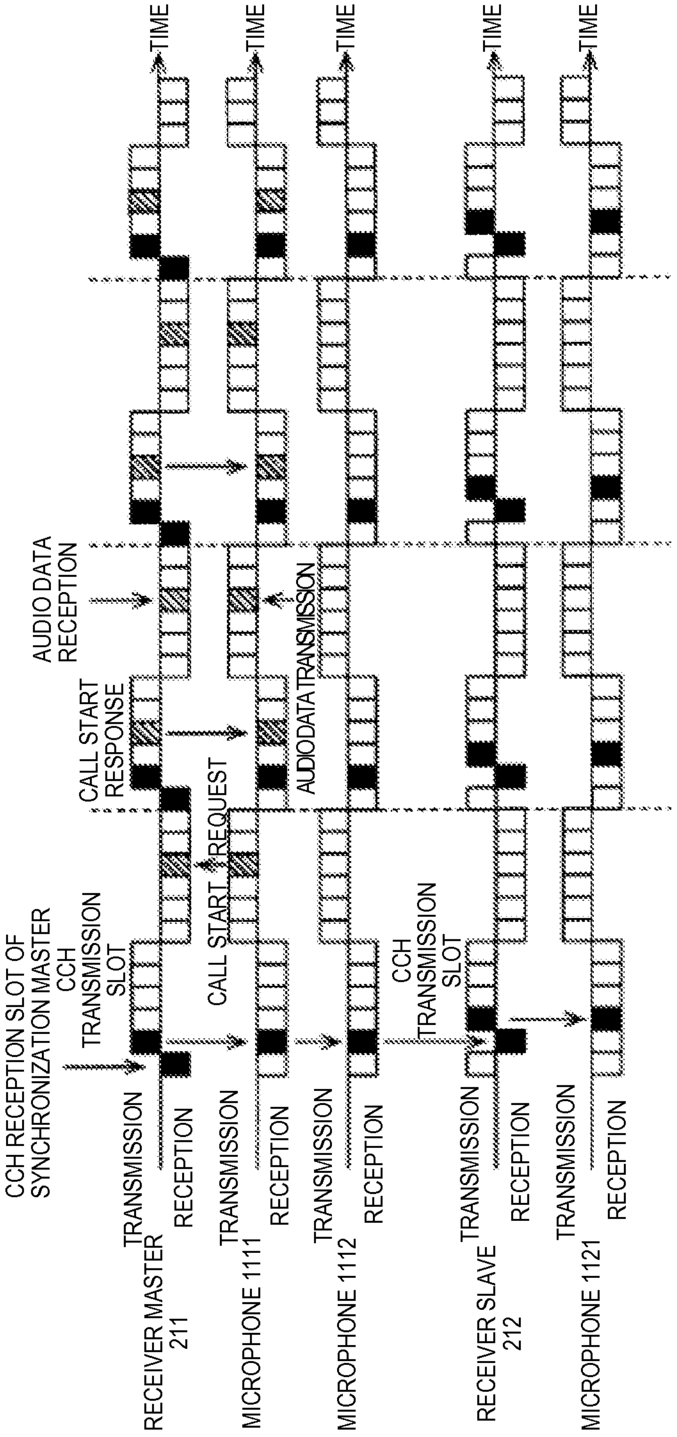
FIG. 7 is a timing chart illustrating a configuration example of a slot at a call start time in the case where audio data is communicated using a single slot in the embodiment.

FIG. 7 is a timing chart illustrating a configuration example of a slot at a call start time, in the case where audio data is communicated using a single slot in the embodiment. In FIG. 7, audio data is communicated using a single slot, and the reversal of a slot is not performed. Two-way communication indicates communication in which transmission slots are secured in both two parties that communicate with each other.

In microphone 1111, wireless controller 12 transmits a call start request to receiver master 211, for example, in the tenth slot of the first cycle (the fourth slot in the transmission slot period). In receiver master 211, wireless controller 22 receives the call start request from microphone 1111, for example, in the tenth slot of the first cycle (the fourth slot in the reception slot period), and transmits a call start response to microphone 1111 in the fourth slot of the second cycle. In microphone 1111, wireless controller 12 receives the call start response from receiver master 211, for example, in the fourth slot of the second cycle.

After communicating the call start response, in receiver master 211, wireless controller 22 transmits predetermined data to microphone 1111, for example, in the fourth slot of each cycle, and receives the audio data from microphone 1111, in the tenth slot of each cycle (the fourth slot in the reception slot period).

Meanwhile, in microphone 1111, wireless controller 12 receives predetermined data from receiver master 211, for example, in the fourth slot of each cycle, and transmits the audio data to receiver master 211, in the tenth slot of each cycle (the fourth slot in the transmission slot period).

The predetermined data includes, for example, NULL data, and other data. Other data include control data for changing the slot used by microphone 1111 to another slot, for example, when a lot of communication interference occurs in microphone system 5.

In two-way communication, receiver master 211 secures slots for communication with microphone 1111. Therefore, receiver master 211 can transmit control data, using the secured slots, other than timing in which the CCH signal is transmitted.

In this manner, in the case of calling using a single slot in two-way communication, slots for transmission from the receiver (for example, receiver master 211) to the microphone (for example, microphone 1111) are secured, and thus it is possible to quickly perform the response for the instruction from the receiver and the response for the request from the microphone.

(Usage of a Single Slot at a Call Start Time in One-Way Communication)

Figure 8:
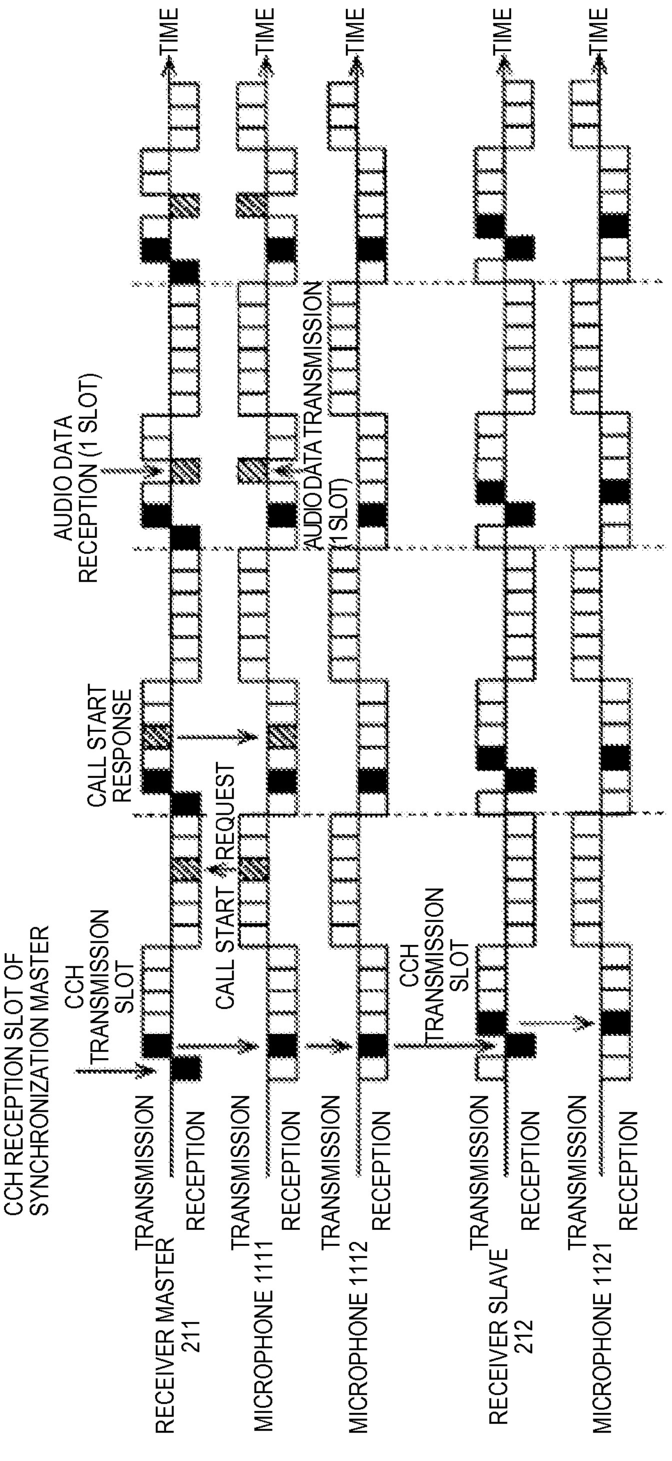
FIG. 8 is a timing chart illustrating another configuration example of a slot at a call start time in the case where audio data is communicated using a single slot in the embodiment.

FIG. 8 is a timing chart illustrating another configuration example of a slot at a call start time in the case where audio data is communicated using a single slot.

In microphone 1111, wireless controller 12 transmits a call start request to receiver master 211, for example, in the tenth slot of the first cycle (the fourth slot in the transmission slot period). In receiver master 211, if wireless controller 22 receives the call start request from microphone 1111, for example, in the tenth slot of the first cycle (the fourth slot in the reception slot period), it transmits a call start response to microphone 1111 in the fourth slot of the second cycle.

In microphone 1111, if wireless controller 12 receives the call start response, for example, in the fourth slot of the second cycle, it reverses the fourth slot of the third cycle to a transmission slot, and transmits the audio data to receiver master 211 in the reversed transmission slot. In receiver master 211, wireless controller 22 reverses, for example, the fourth slot of the third cycle to the reception slot, and receives the audio data from microphone 1111, in the reversed reception slot.

In this manner, even when microphone 1111 receives the call start response, it does not transmit audio data in the next transmission slot period of microphone 1111. Microphone 1111 reverses the fourth slot in the next reception slot period in which the call start response is received, and transmits the audio data.

Thus, for example, when other microphones (microphones other than microphone 1111) transmit a call start request in the transmission slot period, receiver master 211 can receive the call start request. Therefore, for example, the use rate of a microphone increases, and even if the number of free slots is reduced, the receiver is equipped with a system of receiving a call start request, such that a microphone can efficiently be used.

In this manner, in the case of using a single slot in one-way communication, the number of slots used for communication of audio data in one frame is one, such that the consumption of radio resources is reduced, and the number of simultaneously available microphones in the same group or different groups increases. In other words, any of the devices in the same or different group can use a slot vacated by reversal, and can take advantage of the radio resources.

When a call start request is received from a microphone, wireless controller 22 of the receiver may specify whether to communicate audio data using the slot in which the call start request is received, or to communicate audio data using a slot other than the slot in which the call start request is received. Wireless controller 22 may specify whether to communicate audio data using the slot in which the call start request is received in the transmission slot period, or to communicate audio data by reversing the slot in which the call start request is received in the reception slot period. Thus, the receiver can communicate with a plurality of microphones using the same slots in the transmission slot period and the reception slot period.

Next, a registration operation example for registering the IDs of the receiver and the microphone will be described.

(ID Sharing Operation in the Case of Registration of a Microphone to a Receiver Master)

Figure 9:
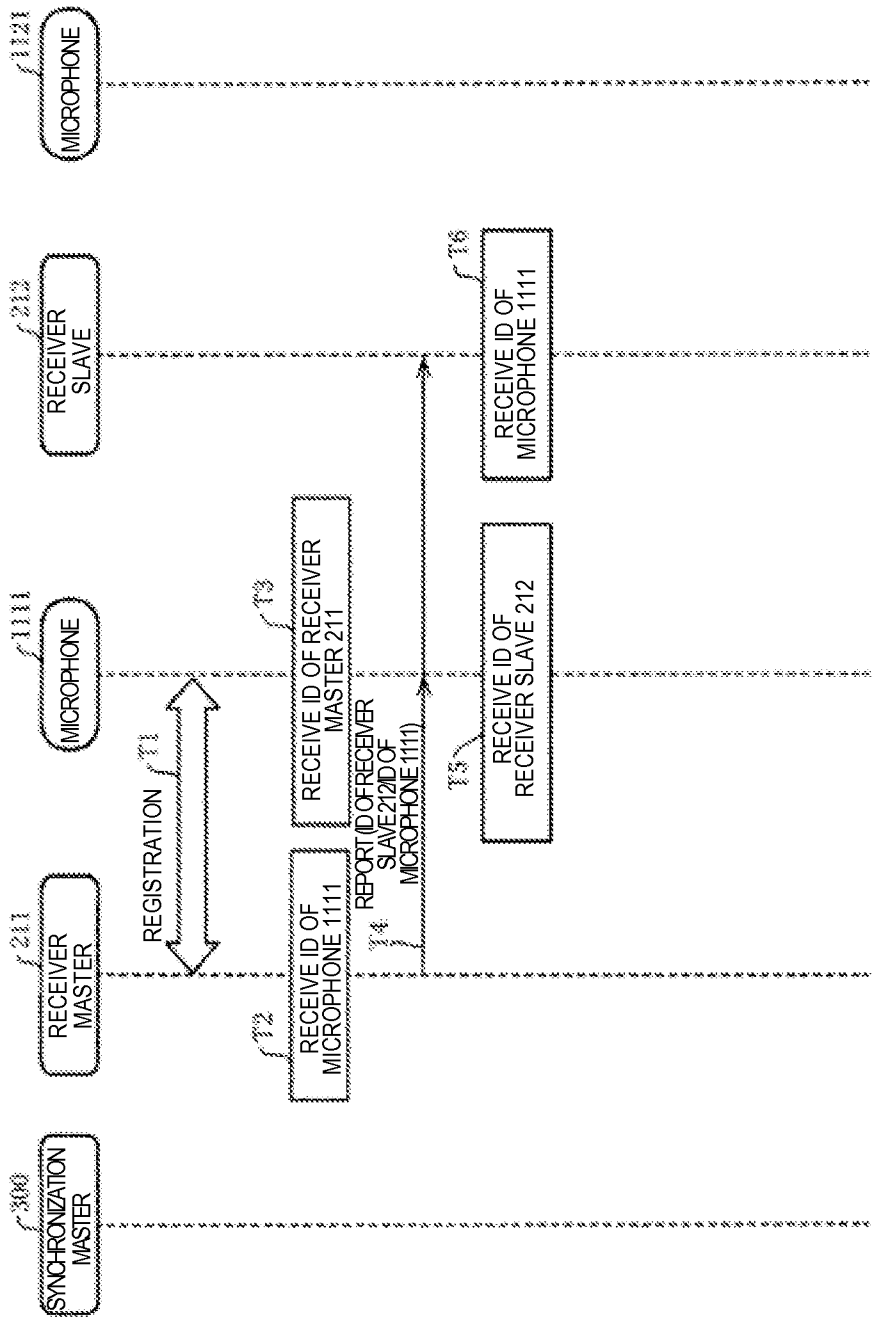
FIG. 9 is a sequence diagram illustrating an operation example of sharing IDs in the case of registration of information about a microphone to a receiver master in the microphone system of the embodiment.

FIG. 9 is a sequence diagram illustrating an operation example of sharing IDs in the case of registration of a microphone to a receiver master in microphone system 5. FIG. 9 illustrates the case in which microphone 1111 is registered to receiver master 211. Synchronization master 300 is usually, for example, in a state of power-on. If receiver master 211 is powered on, synchronization master 300 transmits a CCH signal to receiver master 211, and, synchronizes slots. Synchronization master 300 is a device used by receiver master 211 for synchronization, and does not contribute to the operation when microphone 1111 is registered to receiver master 211.

In receiver master 211, if for example, registration button 28*a* is pressed, controller 25 proceeds to the registration mode. In microphone 1111, if for example, registration button 18*a* is pressed, controller 15 performs the registration process with receiver master 211 which is in the registration mode (T1).

In the registration process, IDs are exchanged between receiver master 211 and microphone 1111. The ID of microphone 1111 is included, for example, in the registration start request (not shown) of microphone. The ID of receiver master 211 is included, for example, in the CCH signal that is transmitted by receiver master 211. The ID of microphone 1111 may be transmitted through a signal other than the CCH signal.

Before the registration operation of microphone 1111, receiver slave 212 is registered to receiver master 211. Also in this case, similarly, in receiver master 211, controller 25 proceeds to the registration mode. In receiver slave 212, if registration button 18*a* is pressed, controller 25 performs the registration process with receiver master 211 which is in the registration mode. Thus, IDs are shared between receiver master 211 and receiver slave 212, and a group is formed between receiver master 211 and receiver slave 212.

Receiver master 211 stores the ID of microphone 1111 that is acquired in the registration process of procedure T1, in storage unit 25*a* of controller 25 (T2). Similarly, microphone 1111 stores the ID of receiver master 211 that is acquired in the registration process of procedure T1, in storage unit 15*a* of controller 15 (T3).

In receiver master 211, wireless controller 22 reports the ID of receiver slave 212 and the ID of microphone 1111, to microphone 1111 and receiver slave 212 (T4). The report is performed by using, for example, the CCH signal.

In microphone 1111, wireless controller 12 acquires the ID of receiver slave 212 that is transmitted from receiver master 211, and stores the acquired ID in storage unit 15*a* of controller 15 (T5). In receiver slave 212, wireless controller 22 acquires the ID of microphone 1111 that is transmitted from receiver master 211, and stores the acquired ID in storage unit 25*a* of controller 25 (T6).

In this manner, since the ID of microphone 1111 is registered to any receiver (for example, receiver master 211), the ID of microphone 1111 may be registered also to receiver slave 212, through the registration process. Thus, both receiver master 211 and receiver slave 212 can use microphone 1111. Therefore, it is possible to save labor of performing the registration process of a microphone to each of the plurality of receivers.

In the notification of ID by receiver master 211, wireless controller 22 of receiver master 211 may send, for example, a notification of all IDs held by receiver master 211 (for example, the ID of each receiver slave, and the ID of each microphone).

Wireless controller 22 of receiver master 211 may send a notification of the ID not only at a timing in which the registration process of ID of a microphone is performed, but also periodically. Thus, for example, it is possible to prevent receiver slave 212 from not receiving the ID from receiver master 211, due to that power is not turned on or communication is interrupted.

(ID Sharing Operation in the Case of Registration of a Microphone to a Receiver Slave)

Figure 10:
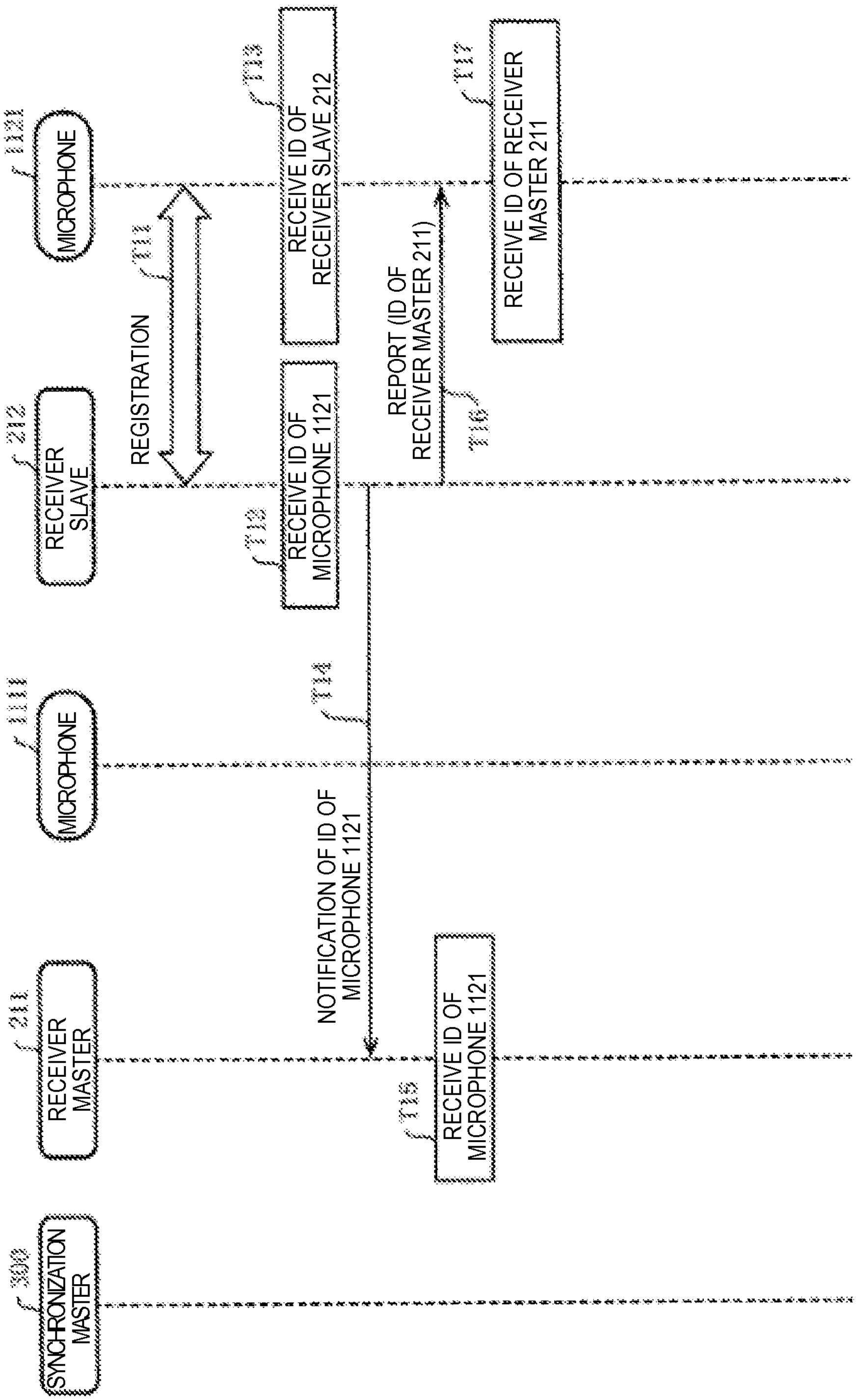
FIG. 10 is a sequence diagram illustrating an operation example of sharing IDs in the case of registration of information about the microphone to a receiver slave in the microphone system of the embodiment.

FIG. 10 is a sequence diagram illustrating an operation example of sharing IDs in the case of registration of a microphone to a receiver slave in the microphone system 5. In FIG. 10, microphone 1121 is registered to receiver slave 212.

In receiver slave 212, for example, if registration button 28*a* is pressed, controller 25 proceeds to a registration mode. In microphone 1121, for example, if registration button 18*a* is pressed, controller 15 performs a registration process with receiver slave 212 which is in the registration mode (T11).

In the registration process, ID is exchanged between receiver slave 212 and microphone 1121. The ID of microphone 1121 is included, for example, in the registration start request (not shown). The ID of receiver slave 212 is included, for example, in the CCH signal transmitted from receiver slave 212. The ID of microphone 1121 may be transmitted through a signal other than the CCH signal.

Receiver slave 212 stores the ID of microphone 1121 that is acquired in the registration process of procedure T11, in storage unit 25*a* in controller 25 (T12). Similarly, microphone 1121 stores the ID of receiver slave 212 that is acquired in the registration process of procedure T11, in storage unit 15*a* in controller 15 (T13).

In receiver slave 212, wireless controller 22 notifies receiver master 211 of the registered ID of microphone 1121 (T14). This notification is performed without using the CCH signal, for example, differently from the case of the notification from receiver master 211 to receiver slave 212. In receiver slave 212, wireless controller 22 transmits, for example, the registered ID of the microphone, at a timing in which the ID of microphone 1121 is registered.

In receiver master 211, wireless controller 22 acquires the ID of microphone 1121 that is transmitted from receiver slave 212, and stores the acquired ID in storage unit 25*a* of controller 25 (T15).

In receiver slave 212, wireless controller 22 notifies microphone 1121 of the ID of receiver master 211 (T16). The notification is performed, for example, in the CCH signal.

In microphone 1121, wireless controller 12 acquires the ID of receiver master 211 that is transmitted from receiver slave 212, and stores the acquired ID in storage unit 15*a* of controller 15 (T17).

In this manner, the ID of microphone 1121 is registered to receiver master 211 by the registration process, by registering the ID of microphone 1121 to any receiver (for example, receiver slave 212). Thus, both receiver master 211 and receiver slave 212 can use microphone 1121. Therefore, it is possible to reduce the amount of labor of performing the registration process of a microphone, to each of a plurality of receivers.

According to a registration operation example illustrated in FIG. 9 or FIG. 10, a group is formed and communication can be performed between a receiver and a microphone that do not directly transmit the ID from the microphone (that are not registration targets). Therefore, handover is possible between the microphone and a receiver other than a receiver to be registered.

Here, for example, the registration process when a microphone is established is assumed, but the registration process when a receiver is established is applicable. In this case, for example, receiver master exchanges ID with newly established receiver slave, and stores (registers) the ID of the receiver slave in storage unit 25*a*. The receiver master may report the ID of the receiver slave, to other receiver slaves and the registered microphones.

Next, a switching operation example of a receiver will be described.

(A First Operation Example of Receiver Switching)

Figure 11:
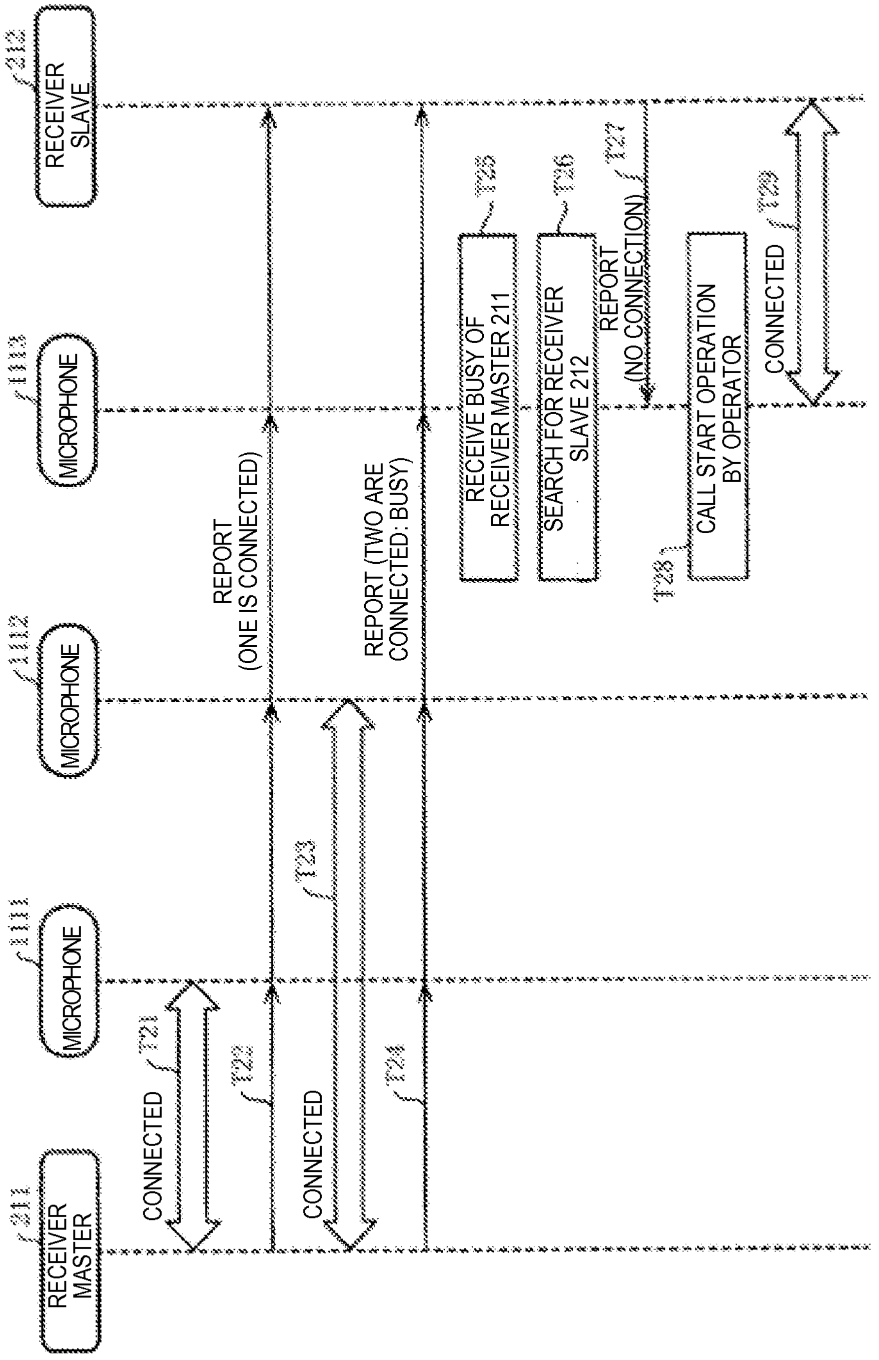
FIG. 11 is a sequence diagram illustrating a first operation example of receiver switching in the microphone system of the embodiment.

FIG. 11 is a sequence diagram illustrating a first operation example of switching of the receiver by microphone system 5.

When receiver master 211 and microphone 1111 are connected with each other (T21), in receiver master 211, wireless controller 22 reports information including that receiver master 211 is connected to one microphone (microphone 1111) (one is connected), using the CCH signal. Specifically, wireless controller 22 reports the information about one communication to microphones 1111, 1112, and 1113, and receiver slave 212 (T22).

Subsequently, when receiver master 211 and microphone 1112 become connected with each other (T23), in receiver master 211, wireless controller 22 reports information containing a fact that receiver master 211 is connected to two microphones (microphone 1111 and microphone 1112), using the CCH signal. Specifically, wireless controller 22 reports the information, that is, information containing "BUSY" to microphones 1111, 1112, and 1113, and receiver slave 212 (T24).

"BUSY" means a state in which the simultaneous connection possible number (here, two) of microphones are already connected to the receiver and connection is not allowable for a call start request. Therefore, the CCH signal used in T24 is an example of first control data containing information indicating a wireless connection state of the receiver.

The number of microphones in wirelessly connection with receiver master 211 is regularly reported to each microphone through the CCH signal. Therefore, if the CCH signal is received, microphone 1113 can check whether or not it is connectable to receiver master 211.

Meanwhile, receiver slave 212 also notifies each microphone of information about the number of microphones being in wireless connection. Here, microphone 1113 assumes that the default-set receiver is receiver master 211. In this case, microphone 1113 receives the CCH signal from receiver master 211, and ignores the CCH signal from receiver slave 212.

In microphone 1113, if "BUSY" is received from receiver master 211 (T25), wireless controller 12 searches for receiver slave 212 (T26). Specifically, microphone 1113 searches the CCH signal from radio waves that can be received. Then, wireless controller 12 checks the identification information (header) of the CCH signal, and checks and determines whether or not the CCH signal is the CCH signal from receiver slave 212. As a result, in the case of the CCH signal from receiver slave 212, wireless controller 12 receives the CCH signal from subsequent receiver slave 212 (changes the reception destination of the CCH signal from receiver master 211 to receiver slave 212).

Thereafter, a message there is no microphone being in wireless connection (no call) is reported from receiver slave 212, for example, using the CCH signal, to microphone 1113 (T27).

In microphone 1113, if call button 18*b* is operated by an operator (T28), wireless controller 12 starts communication between microphone 1113 and receiver slave 212. Thus, microphone 1113 and receiver slave 212 become connected with each other (T29).

Figure 12:
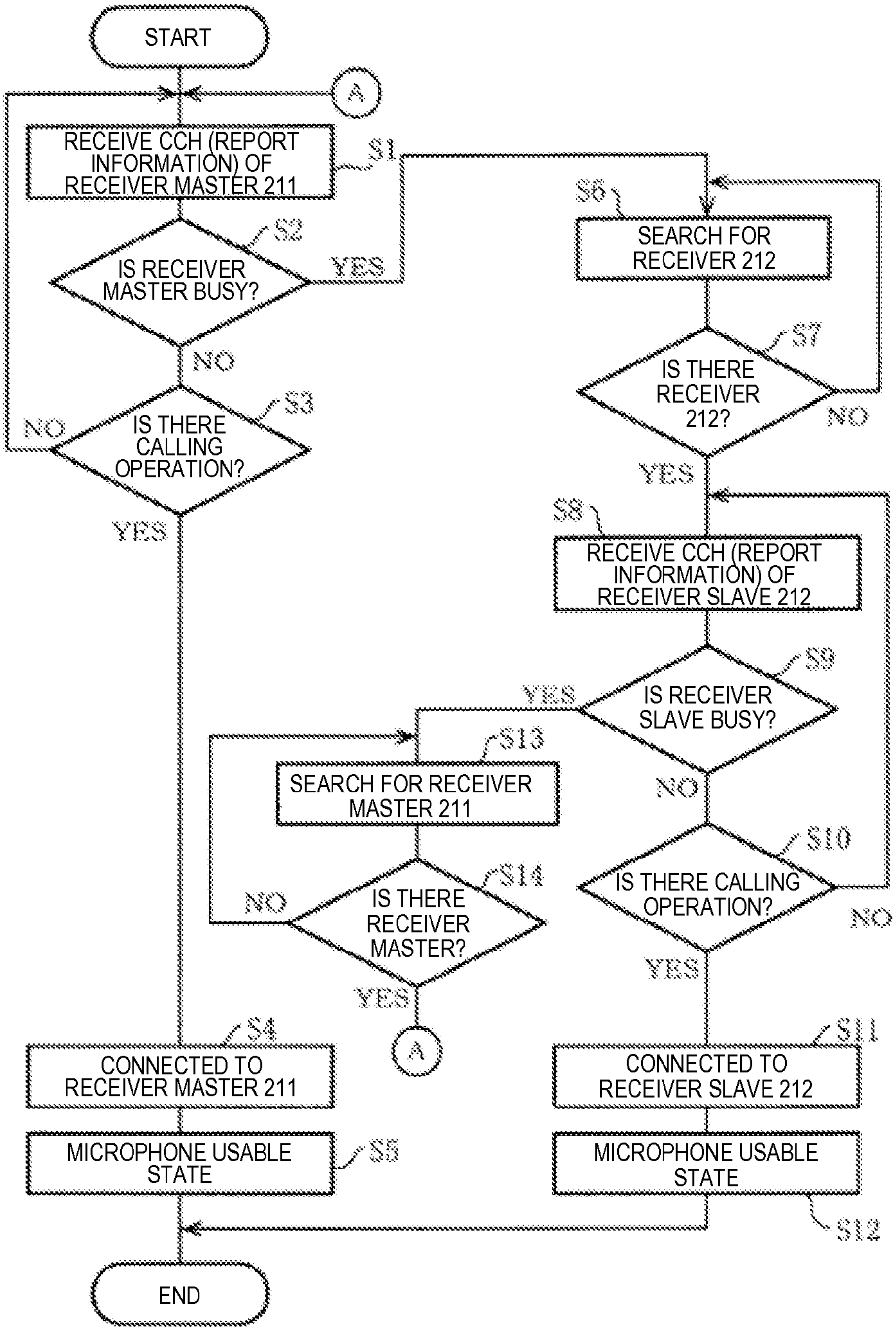
FIG. 12 is a flowchart illustrating the first operation example of the receiver switching by the microphone of the embodiment.

FIG. 12 is a flowchart illustrating the first operation example of the receiver switching by microphone 1113.

First, wireless controller 12 receives the CCH signal (an example of report information) from receiver master 211 (S1).

Controller 15 determines whether or not receiver master 211 is "BUSY" (S2).

When receiver master 211 is not "BUSY", controller 15 determines whether or not there is a call start request, that is, a calling operation (S3). When there is no calling operation, the process returns to the process of S1.

When there is a calling operation, wireless controller 12 is wirelessly connected to receiver master 211 (S4). Thus, microphone 1113 becomes a usable state (S5). Thereafter, microphone 1113 ends this operation.

In S2, where receiver master 211 is "BUSY", wireless controller 12 searches for another receiver (here, receiver slave 212) (S6). In this case, controller 15 sequentially changes a search destination, by referring to ID stored in storage unit 15*a*, and causes wireless controller 12 to search a receiver. When there is wireless connection to the search destination, the search destination is a destination to be connected after receiver switching. Similarly, in the subsequent searching, controller 15 designates a search destination.

As a result of search, wireless controller 12 determines whether or not there is receiver slave 212 (S7). When there is no receiver slave 212, the process returns to the process of S6.

When there is receiver slave 212, wireless controller 12 receives the CCH signal transmitted from receiver slave 212 (S8).

Wireless controller 12 determines whether or not receiver slave 212 is "BUSY" (S9).

When receiver slave 212 is not "BUSY", controller 15 determines whether or not the calling operation is performed by the operator (S10). When the calling operation is not performed, the process returns to the process of S8.

Meanwhile, when a calling operation is performed, wireless controller 12 is wirelessly connected to receiver slave 212 (S11). Thus, microphone 1113 becomes a usable state (S12). Thereafter, microphone 1113 ends this operation.

In S9, when receiver slave 212 is "BUSY", wireless controller 12 searches receiver master 211 (S13).

As a result of search, wireless controller 12 determines whether or not there is receiver master 211 (S14). When there is no receiver master 211, the process returns to the process of S13. Meanwhile, when there is receiver master 211, the process returns to the process of S1.

In this manner, if "BUSY" state continues in receiver master 211 or receiver slave 212, microphone 1113 sequentially switches and hands over the receiver destined to be connected. In the process of FIG. 12, since handover is performed before a call start operation, microphone 1113 has a high possibility of being able to be quickly connected to any receiver when it desires to start a call. The call start operation is an example of a data transmission start operation.

When the "BUSY" state continues even after a predetermined time has elapsed, or "BUSY" state is detected a predetermined number of times, controller 15 may send an error notification. The error notification includes, for example, blinking of LED18*c* of microphone 1113. Thus, the user can recognize that wireless connection is not possible due to "BUSY" state.

According to the first operation example of receiver switching, the microphone can perform switching to an appropriate receiver, depending on the use state of a receiver. Since a microphone switches a receiver which is a transmission destination of audio data before receiving a call start operation, it is possible to quickly start a call after the call start operation.

(A Second Operation Example of Receiver Switching)

Next, a second operation example of receiver switching will be described.

The second operation example of receiver switching illustrates the case where the number of receiver switching operations is reduced than the number of switching operations in the case of the first operation example.

Figure 13:
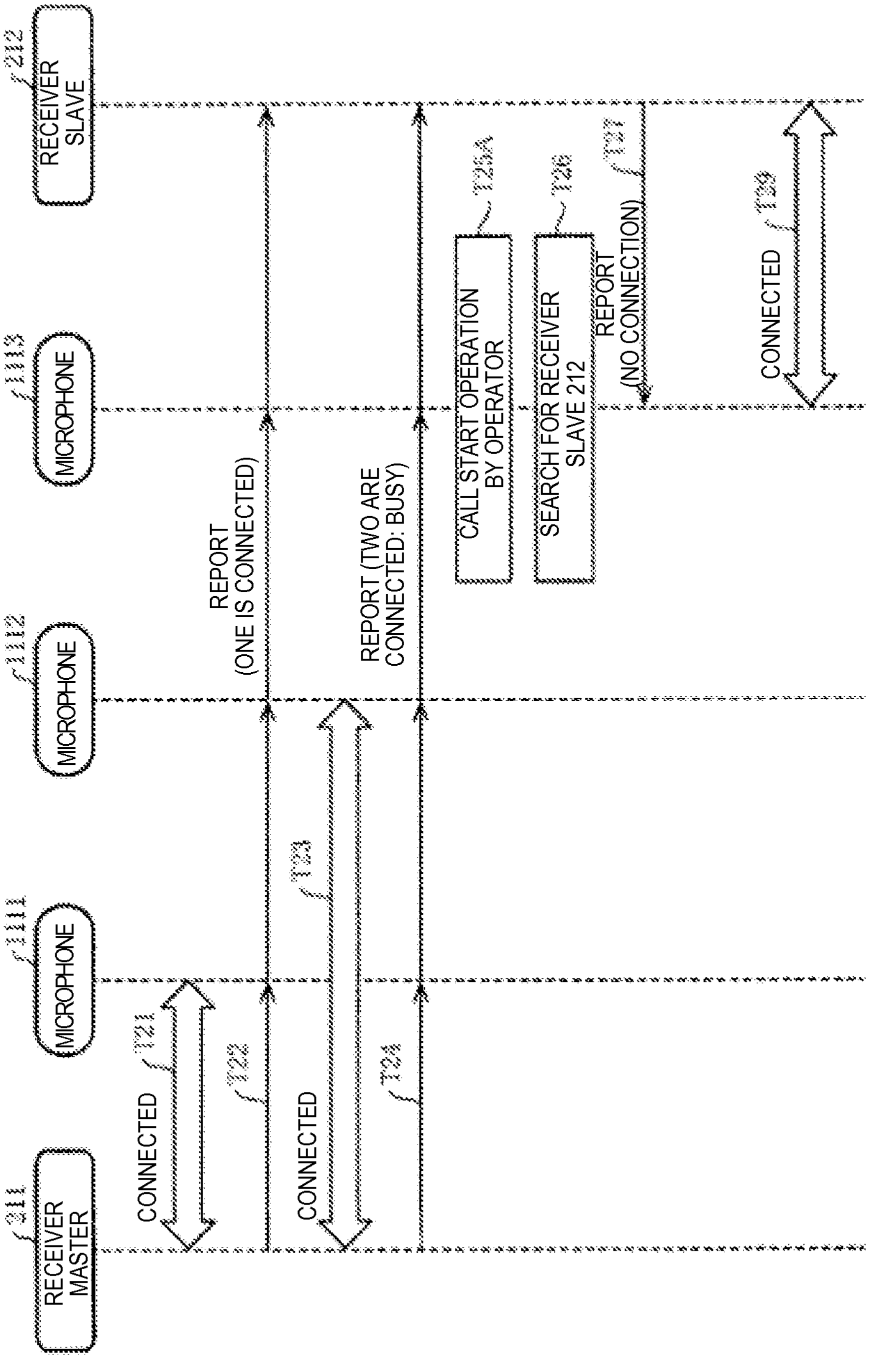
FIG. 13 is a sequence diagram illustrating a second operation example of the receiver switching in the microphone system of the embodiment.

FIG. 13 is a sequence diagram illustrating a second operation example of the receiver switching by microphone system 5. The same procedure as in FIG. 11 of the first embodiment is denoted by the same reference numerals, and thus a description thereof will be omitted or simplified.

In microphone 1113, when "BUSY" is reported from receiver master 211, controller 15 switches a receiver after call button 18*b* is operated by the operator.

In other words, if "BUSY" is reported from receiver master 211 in procedure T24, in microphone 1113, wireless controller 12 waits for call button 18*b* being operated by the operator. If the operation of call button 18*b* is performed (T25A), wireless controller 12 searches receiver slave 212 (T26).

In receiver slave 212, wireless controller 22 reports a fact that there is no microphone being in wireless connection (no call), to microphone 1113, for example, using the CCH signal (T27).

In microphone 1113, if information indicating that there is no call is received from receiver slave 212, wireless controller 12 starts a call between microphone 1113 and receiver slave 212. Thus, microphone 1113 and receiver slave 212 become connected with each other (T29).

Figure 14:
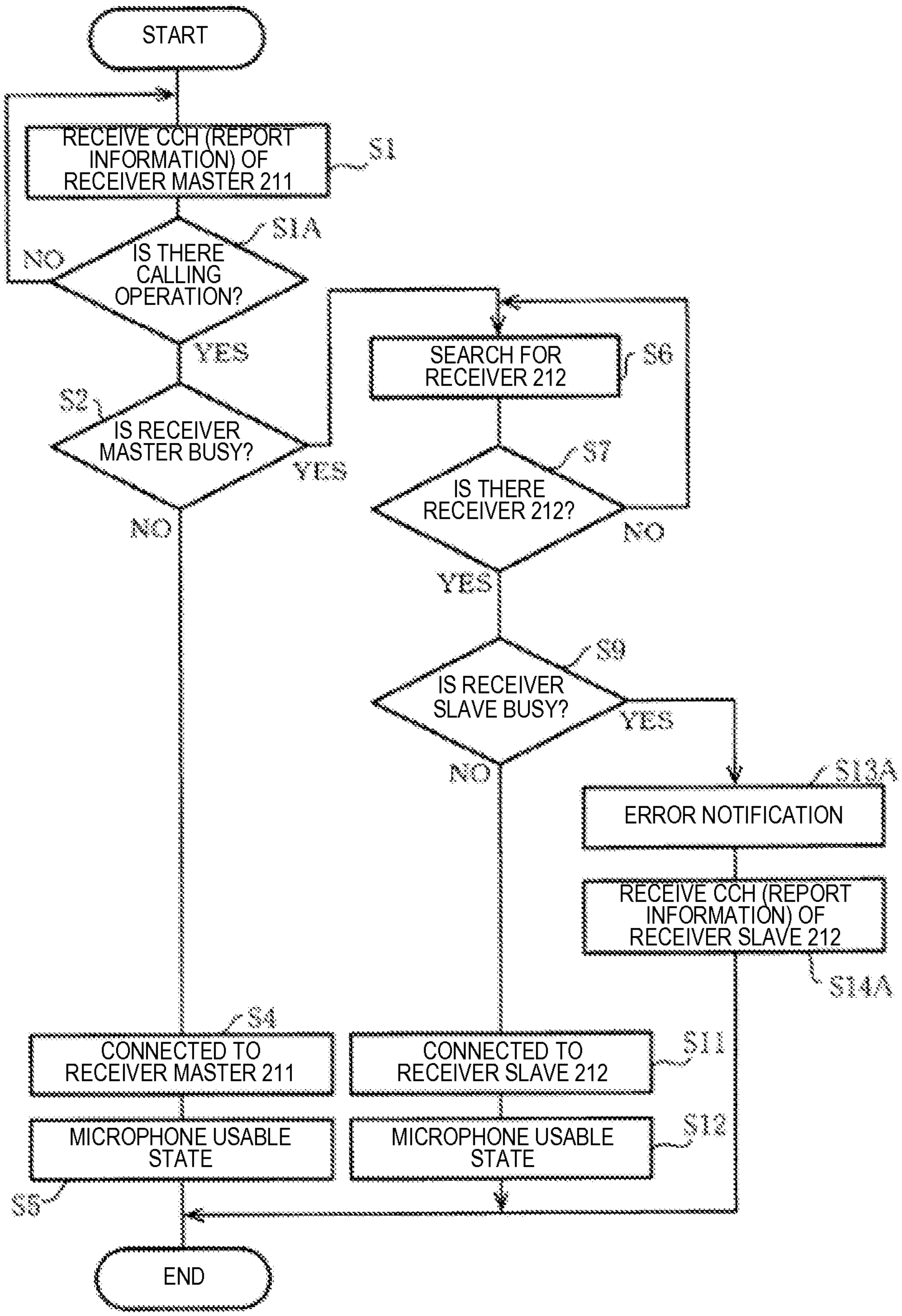
FIG. 14 is a flowchart illustrating the second operation example of the receiver switching by the microphone of the embodiment.

FIG. 14 is a flowchart illustrating the second operation example of the receiver switching by microphone 1113. In FIG. 14, the same step processing as in FIG. 12 is denoted by the same reference numerals, and thus a description thereof will be omitted or simplified.

If wireless controller 12 receives the CCH signal from receiver master 211 (51), controller 15 determines whether or not call button 18*b* is operated by the operator, in other words, whether or not there is a calling operation (S1A). When there is no calling operation, the process returns to the process of S1.

When there is a calling operation, wireless controller 12 determines whether or not receiver master 211 is "BUSY" (S2). When receiver master 211 is not "BUSY", wireless controller 12 is wirelessly connected to receiver master 211 (S4). Thus, microphone 1113 becomes a usable state (S5).

In S2, when receiver master 211 is "BUSY", wireless controller 12 searches receiver slave 212 (S6). As a result of search, wireless controller 12 determines whether or not there is receiver slave 212 (S7). When there is no receiver slave 212, the process returns to the process of S6.

Wireless controller 12 determines whether or not searched receiver slave 212 is "BUSY" (S9). When receiver slave 212 is not "BUSY", wireless controller 12 is wirelessly connected to receiver slave 212 (S11). Thus, microphone 1113 becomes a usable state (S12).

In S9, when receiver slave 212 is "BUSY", controller 15 performs error notification (S13A). The error notification involves, for example, blinking of LED18*c* of microphone 1113.

Wireless controller 12 receives the CCH signal from receiver slave 212 (S14A). Controller 15 refers to the CCH signal, and when receiver slave 212 is still "BUSY", it may send again error notification, and attempt wireless connection to receiver master 211. Thereafter, microphone 1113 ends this process.

According to the second operation example of receiver switching, since the receiver switching operation is not performed until call button 18*b* for instructing call start is operated, the number of switching can be reduced, and the power consumption of microphone 1113 can be reduced. Thus, before the call start operation, it is possible to prevent the wireless connection destination from being changed frequently, and to reduce the processing load of microphone 1113 before a call starts.

(A Third Operation Example of Receiver Switching)

Next, a third operation example of receiver switching will be described.

The third operation example of receiver switching illustrates the case in which a default value of a wireless connection destination is not held and there is no priority of IDs of a plurality of receivers. In other words, the case is illustrated in which there is no initial configuration in which microphone 1113 is connected to either receiver master 211 or receiver slave 212.

Figure 15:
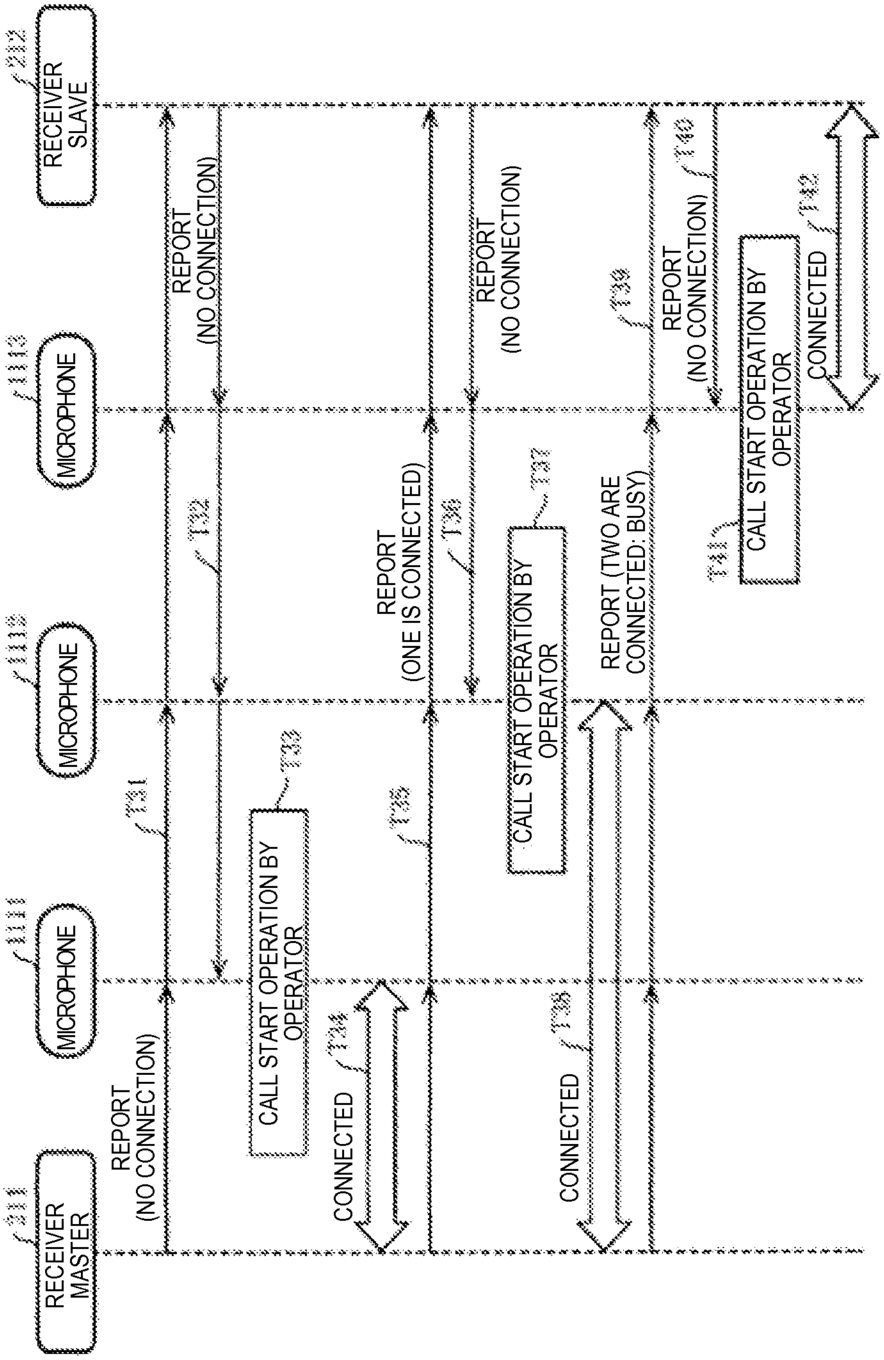
FIG. 15 is a sequence diagram illustrating a third operation example of the receiver switching in the microphone system of the embodiment.

FIG. 15 is a sequence diagram illustrating a third operation example of the receiver switching in microphone system 5.

In receiver master 211, wireless controller 22 transmits (reports) the CCH signal (T31). The CCH signal includes information indicating that there is no call. In receiver slave 212, wireless controller 22 transmits (reports) the CCH signal (T32). The CCH signal includes information of no call.

In microphones 1111, 1112, and 1113, wireless controller 12 does not hold in a default value of a wireless connection destination, such that it receives the CCH signals from both receiver master 211 and receiver slave 212. In microphones 1111, 1112, and 1113, controller 15 can recognize the state of receiver master 211 and the wireless connection state (for example, whether or not it is "BUSY") of receiver slave 212, from both CCH signals. Therefore, the procedure of searching for a receiver is not required.

In microphones 1111, 1112, and 1113, wireless controller 12 receives, for example, the CCH signal from receiver master 211 in the second slot, and receives the CCH signal from receiver slave 212 in the third slot (see FIG. 5).

Thus, if call button 18*b* of microphone 1111 is pressed by the operator (T33), in microphone 1111, wireless controller 12 is wirelessly connected to receiver master 211. Thus, microphone 1111 becomes connected (T34).

In receiver master 211, wireless controller 22 transmits (reports) the CCH signal (T35). The CCH signal contains information indicating that receiver master 211 is connected to one microphone (microphone 1111).

In receiver slave 212, wireless controller 22 transmits (reports) the CCH signal (T36). The CCH signal includes information indicating that there is no call.

If call button 18*b* of microphone 1112 is pressed by the operator (T37), in microphone 1112, wireless controller 12 is wirelessly connected to, for example, receiver master 211. Thus, microphone 1112 becomes connected (T38).

In receiver master 211, wireless controller 22 transmits (reports) the CCH signal (T39). The CCH signal contains a fact that receiver master 211 is connected to two microphones (microphones 1111, and 1112), in other words, "BUSY".

In receiver slave 212, wireless controller 22 transmits (reports) the CCH signal (T40). The CCH signal includes information indicating that there is no call.

If call button 18*b* of microphone 1113 is pressed by the operator (T41), in microphone 1113, wireless controller 12 is wirelessly connected to, for example, receiver slave 212. Thus, microphone 1113 becomes connected (T42).

In T42, in microphone 1113, controller 15 recognizes that receiver master 211 is "BUSY" in T39. Therefore, microphone 1113 does not use receiver master 211 as a target of wireless connection, but use another receiver (in FIG. 15, receiver slave 212) as a target of wireless connection.

Figure 16:
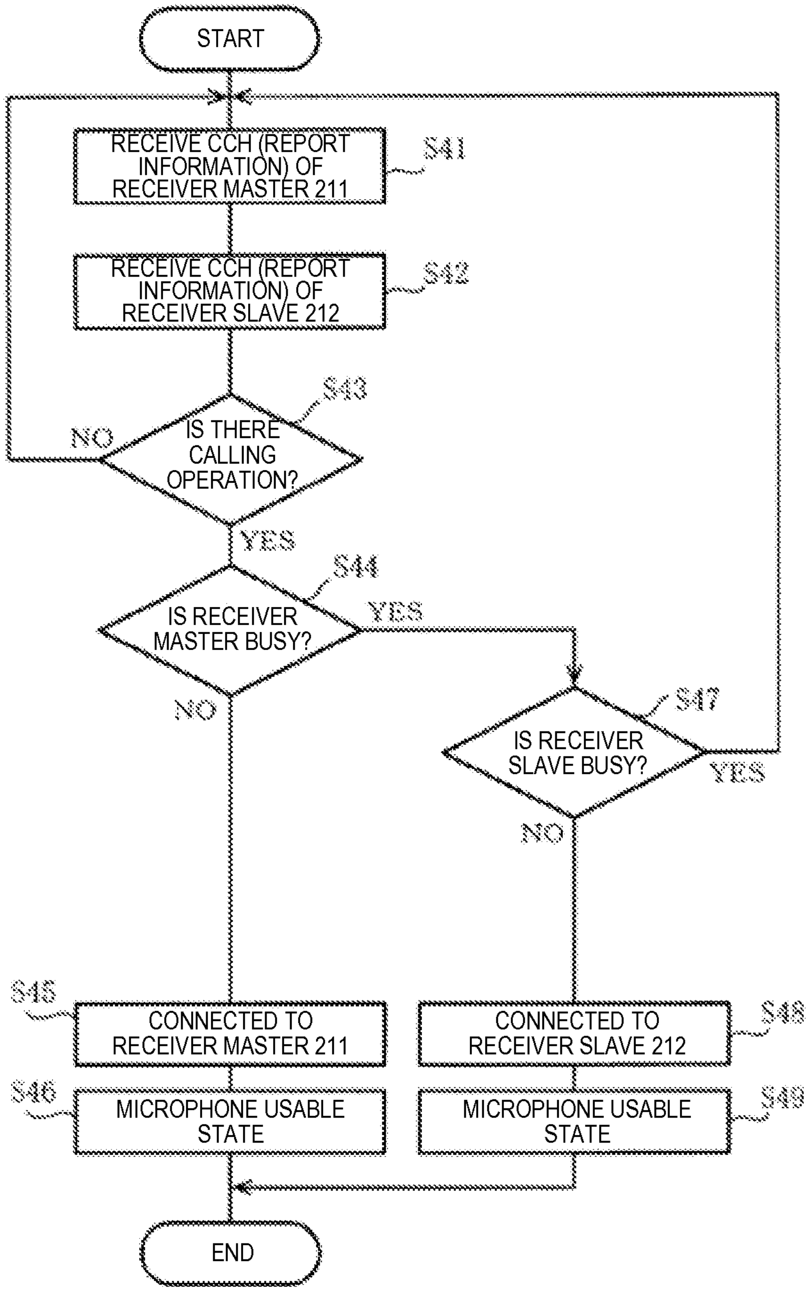
FIG. 16 is a flowchart illustrating a third operation example of the receiver switching in the microphone system of the embodiment.

FIG. 16 is a flowchart illustrating a third operation example of the receiver switching by microphone 1113.

First, wireless controller 12 receives the CCH signal from receiver master 211 (S41). Wireless controller 12 receives the CCH signal from receiver slave 212 (S42).

Controller 15 determines whether or not there is a call start request, that is call button 18*b* is pressed by the operator (whether or not the calling operation has been performed) (S43). When there is no calling operation, the process returns to the process of S41.

When the calling operation is performed, wireless controller 12 determines whether or not receiver master 211 is "BUSY" (S44).

When receiver master 211 is not "BUSY", wireless controller 12 is wirelessly connected to receiver master 211 (S45). Thus, microphone 1113 becomes a usable state (S46). Thereafter, microphone 1113 ends this operation.

In S44, when receiver master 211 is "BUSY", wireless controller 12 determines whether or not receiver slave 212 is "BUSY" (S47).

When receiver slave 212 is not "BUSY", wireless controller 12 is wirelessly connected to receiver slave 212 (S48). Thus, microphone 1113 becomes a usable state (S49). Thereafter, microphone 1113 ends this operation.

In S47, when receiver slave 212 is "BUSY", the process returns to the process of S41. At this time, controller 15 of microphone 1113 may send an error notification. The error notification includes, for example, blinking of LED18*c* of microphone 1113. Thus, the user can recognize the fact that wireless connection is not possible due to "BUSY" state.

According to the third operation example of receiver switching, the microphone receives the CCH signal from a plurality of (for example, two) receivers, and thus it is possible to recognize a wireless connection status of the receiver that has transmitted the CCH signal. Therefore, the searching for a wireless connection destination is not required, and a switching operation (wireless connection operation) can be speeded.

Since the infrared transceiver system described in Japanese Patent Unexamined Publication No. 5-327623 uses infrared light for communication, when any obstacle (for example, a wall) is present between a microphone and an infrared receiver, communication quality deteriorates. For example, infrared light is likely to be blocked by the orientation of the user's body of the microphone, and the quality of audio data being communicated may be deteriorated. Similarly, if the user puts the microphone into the user's pocket, the infrared light is likely to be blocked and the communication quality may deteriorate.

In contrast, according to microphone system 5, it is possible to suppress a decrease in communication quality by using wireless communication such as DECT.

According to microphone system 5, even when it is difficult to use a predetermined receiver, another receiver can be used. In this case, since the user can use an available receiver without being particularly conscious of the presence of a plurality of receivers, the convenience for the user is improved. Even when the performance of the receiver is relatively low, the plurality of receivers compromise the processing performance with each other, and thus it is possible to suppress a decrease in the convenience. For example, even when a plurality of receivers are provided in order to increase the processing performance, a registration process is easy when a receiver is newly established and a microphone is newly established, a group can be simply formed.

Since the user of the microphone can sequentially switch a receiver, without selecting a receiver which is a transmission destination, it is possible to suppress a decrease in operability in the case of comparing the infrared light microphone in the related art. Since microphone system 5 does not use infrared light, external light becomes stronger, and it is possible to suppress communication interference due to the external light. Therefore, it is possible to improve communication characteristics (communication quality) in microphone system 5.

Since radio waves generated in wireless communication pass a wall, if infrared light is simply wirelessly communicated, for example, radio waves pass a room and are communicated, in other words, the sound from a microphone in a separate room is likely to be played. In microphone system 5, the handover of a microphone is limited to the same room (group), it is possible to suppress radio waves from passing a room and being communicated, and in other words, to prevent the sound from a microphone in a separate room from being played.

Since microphone system 5 employs a time division manner, it can be applied also to a system requiring for a real-time property such as audio.

Since all receivers are synchronized when the time division manner is employed, even if a plurality of microphones and receiver are present, it is possible to perform communication while suppressing interference. Therefore, communication quality can be improved.

In this manner, according to microphone system 5, each device (for example, a microphone) is easily operated, and thus the convenience for the user can be improved.

In the present embodiment, a description has been made regarding a microphone, in other words, communication of audio data, but data other than images (videos, materials, and the like) may be used. For example, the present embodiment can be used when a teacher lectures using a microphone while presenting lecture materials in a lecture room.

Modification Example

In the above embodiments, the case has been illustrated in which synchronization master 300 also serves as the receiver master, but synchronization master may be installed independently.

Figure 17:
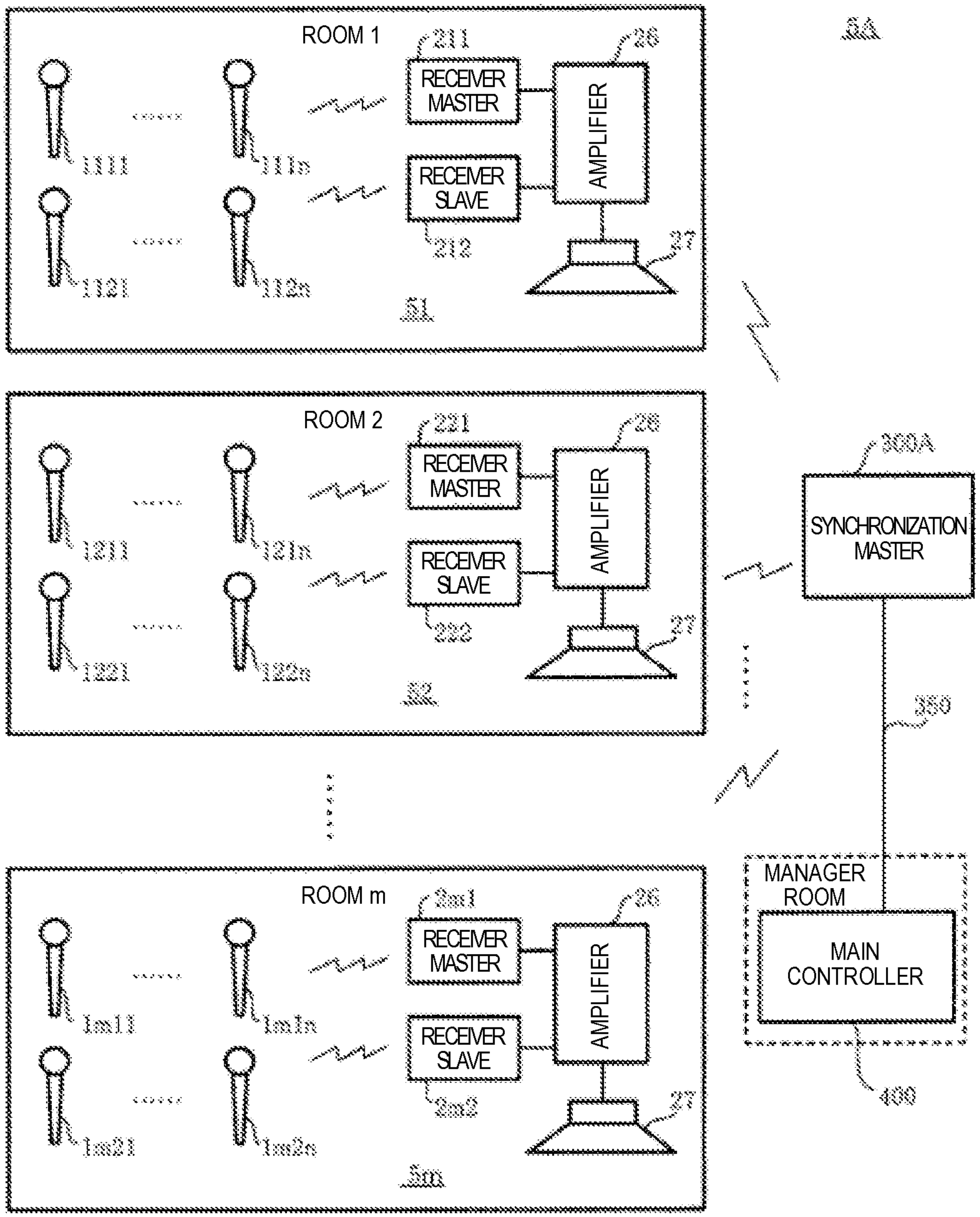
FIG. 17 is a schematic diagram illustrating an entire configuration example of a microphone system in a modification example.

FIG. 17 is a schematic diagram illustrating an entire configuration example of microphone system 5A in a modification example. In microphone system 5A, synchronization master 300A and receiver master 221 are independently installed.

Synchronization master 300A is connected to, for example, respective receiver masters 211, 221, **2*m*1, . . . , and communicate with each other according to a predetermined time division communication scheme (for example, a DECT communication scheme). Synchronization master 300A is connected to, for example, main controller 400 that is installed by an administrator, through a LAN cable 350, and is controlled by main controller 400**.

Since synchronization master 300A is installed independently, microphone system 5A having good extensibility can be provided.

Although various embodiments have been described with reference to the drawings, it goes without saying that the present invention is not limited to such embodiments. It is obvious that the skilled in the art can conceive various changes and modifications, within the scope described in the claims, and it is understood that those naturally belong to the technical scope of the present invention.

What is claimed is:

1. A wireless communication system comprising:

a transmitter that wirelessly transmits data; and a plurality of receivers, wherein the receivers include at least a first receiver and a second receiver;

wherein the first receiver transmits identification information of the first receiver and identification information of the second receiver to the transmitter, wherein the transmitter includes:

a first storage unit that stores the identification information of the first receiver and the identification information of the second receiver;

a first communication unit that transmits the data; and a switching unit that switches a transmission destination of the data to the second receiver having the identification information stored in the first storage unit, wherein each receiver includes:

a second storage unit; and a second communication unit, wherein the transmitter transmits identification information of the transmitter to the first receiver, wherein the second communication unit of the first receiver receives the identification information of the transmitter transmitted from the transmitter, wherein the second storage unit of the first receiver stores the identification information of the transmitter, wherein the second communication unit of the first receiver transmits the received identification information of the transmitter to the second receiver, wherein the second communication unit of the second receiver receives the identification information of the transmitter from the first receiver, wherein the second storage unit of the second receiver stores the identification information of the transmitter, and wherein the second communication unit of the second receiver receives the data from the transmitter.

2. The wireless communication system of claim 1, wherein the receivers include the first receiver, the second receiver, and a third receiver, wherein the transmitter and the first receiver perform wireless communication with each other, wherein the transmitter and the second receiver perform wireless communication with each other, and wherein the transmitter and the third receiver do not perform wireless communication with each other.

3. The wireless communication system of claim 1, wherein the transmitter, first receiver, and second receiver wirelessly communicate in a time division manner.

4. The wireless communication system of claim 2, wherein the wireless communication is wireless communication of a time division manner, and wherein the third receiver further includes a synchronization unit that performs synchronization with at least the first receiver.

5. The wireless communication system of claim 1, wherein the first communication unit receives first control data containing information indicating a wireless connection state of the first receiver, from the first receiver, and wherein the switching unit switches the transmission destination to the second receiver, based on the first control data.

6. The wireless communication system of claim 1, wherein the transmitter includes an operation unit that receives a data transmission start operation, and wherein the switching unit switches the transmission destination to the second receiver, before receiving the data transmission start operation by the operation unit.

7. The wireless communication system of claim 1, wherein the transmitter includes an operation unit that receives a data transmission start operation, and wherein the switching unit switches the transmission destination to the second receiver, after receiving the data transmission start operation by the operation unit.

8. The wireless communication system of claim 1, wherein the transmitter, the first receiver, and the second receiver wirelessly communicate in a time division manner, wherein the second communication unit of the first receiver transmits, using a first time slot at a predetermined position, second control data containing information about a use state of a second time slot, to the transmitter, wherein the first communication unit receives the second control data, wherein the transmitter includes a communication controller that determines a position of the second time slot that transmits the data, based on the second control data, and wherein the first communication unit transmits the data, using the second time slot at the determined position.

9. The wireless communication system of claim 8, wherein frames of the wireless communication system alternately and periodically include transmission time slots and reception time slots, and wherein the communication controller performs control of transmitting the data to the second receiver, using the second time slot at the determined position, at a cycle of the transmission time slots, and transmitting the data to the second receiver, using a reversed transmission time slot obtained by reversing a reception time slot at the determined position into a transmission time slot, at a cycle of the reception time slots.

10. The wireless communication system of claim 8, wherein frames of the wireless communication system alternately and periodically include transmission time slots and reception time slots, and wherein the communication controller performs control of transmitting the data to the second receiver, using the second time slot at the determined position, at a cycle of the transmission time slots, and receiving control data from the first receiver, using a third time slot at the determined position, at a cycle of the reception time slots.

11. The wireless communication system of claim 8, wherein frames of the wireless communication system alternately and periodically includes transmission time slots and reception time slots, and wherein the communication controller performs control of transmitting the data to the second receiver, using a reversed transmission time slot obtained by reversing a reception time slot at the determined position into a transmission time slot, at a cycle of the reception slots, and not performing communication using a transmission time slot at the determined position, at a cycle of the transmission slots.

12. The wireless communication system of claim 1, wherein the data is audio data or image data.

* * * * *